US012304216B2

(12) United States Patent
Kawakita

(10) Patent No.: US 12,304,216 B2
(45) Date of Patent: May 20, 2025

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventor: Akihiro Kawakita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 162 days.

(21) Appl. No.: 18/214,784

(22) Filed: Jun. 27, 2023

(65) Prior Publication Data

US 2023/0415486 A1 Dec. 28, 2023

(30) Foreign Application Priority Data

Jun. 28, 2022 (JP) ................................ 2022-103642

(51) Int. Cl.
*B41J 2/175* (2006.01)

(52) U.S. Cl.
CPC ....... *B41J 2/17566* (2013.01); *B41J 2/17596* (2013.01)

(58) Field of Classification Search
CPC ..... B41J 2/17566; B41J 2/175; B41J 2/17596
See application file for complete search history.

(56) References Cited

U.S. PATENT DOCUMENTS 8,100,500 B2 * 1/2012 Bansyo .................... B41J 2/185 347/7
9,498,971 B2 * 11/2016 Matsushima ........ B41J 2/17566
11,198,304 B2 * 12/2021 Morikawa .............. B41J 29/393

FOREIGN PATENT DOCUMENTS

JP 2018150159 A 9/2018

* cited by examiner

*Primary Examiner* — An H Do
(74) *Attorney, Agent, or Firm* — K&L Gates LLP

(57) ABSTRACT

A printer includes a container configured to store a liquid, a transducer configured to humidify air by causing the liquid stored in the container to vibrate, a first change mechanism including at least one of a first valve or a first pump, and configured to change a liquid level of the liquid stored in the container, a first sensor configured to output a first detection signal indicating that the liquid level reaches a first height, a processor, and a memory storing computer-readable instructions that instruct the processor to perform processes. The processes include change processing of controlling the first change mechanism and changing the liquid level, and first maintaining processing of, after the change processing is performed, controlling the first change mechanism and maintaining the liquid level at a maintained position lower than the first height and higher than the bottom surface of the container.

10 Claims, 17 Drawing Sheets

PRINTER, CONTROL METHOD, AND NON-TRANSITORY COMPUTER-READABLE MEDIUM STORING COMPUTER-READABLE INSTRUCTIONS

REFERENCE TO RELATED APPLICATIONS

This application claims priority from Japanese Patent Application No. 2022-103642 filed on Jun. 28, 2022. The entire content of the priority application is incorporated herein by reference.

BACKGROUND ART

The present disclosure relates to a printer, a control method, and a non-transitory computer-readable medium storing computer-readable instructions.

A printer is provided with an image formation mechanism and prints an image on a medium using the image formation mechanism. Furthermore, the printer is provided with a humidifier, a tank, a float sensor, a supply mechanism, and a replenishing mechanism. The humidifier humidifies air. The tank stores a liquid. The float sensor detects when an amount of the liquid in the tank has reached an amount considered to be full. The supply mechanism supplies the liquid from the tank to the humidifier. The replenishing mechanism replenishes the liquid in the tank. The printer replenishes the liquid to the tank from the replenishing mechanism when the amount of liquid in the tank decreases. After that, when it is detected by the float sensor that the amount of liquid in the tank has reached the amount considered to be full, the printer stops the replenishment of the liquid from the replenishing mechanism to the tank.

DESCRIPTION

In the above-described printer, the humidifier may be configured by a transducer, for example. In this case, when a distance from the transducer to a liquid surface increases, there is a possibility that an atomizing performance of the transducer may deteriorate. The reason for this is that when the distance from the transducer to the liquid surface increases, it becomes more difficult for vibrations generated by the transducer to be transmitted to the liquid surface.

In the above-described printer, when it is detected by the float sensor that the amount of liquid in the tank has reached the amount considered to be full, the replenishment of the liquid from the replenishing mechanism to the tank is stopped. Thus, for example, immediately after the replenishment of the liquid from the replenishing mechanism to the tank is stopped, a liquid level in the tank is relatively high, and the distance from the transducer to the liquid surface is increased. Thus, in the above-described printer, when the humidifier is configured by the transducer, immediately after the replenishment of the liquid from the replenishing mechanism to the tank is stopped, there is a possibility that the atomizing performance of the transducer may deteriorate.

In an inkjet printer, when humidification is started from a state in which the atomizing performance of the transducer has deteriorated, there is a possibility that a humification time until an actual humidity reaches a target humidity may become longer. When the humification time until the actual humidity reaches the target humidity becomes longer, there is a possibility that a delay may occur in a start of printing, for example. Alternatively, for example, there is a possibility that the actual humidity may not reach the target humidity by the start of the printing. Furthermore, there is a possibility that the actual humidity may not reach the target humidity during the printing. If the printing is performed in a state in which the actual humidity has not reached the target humidity, there is a possibility that an ink discharge failure may occur.

Embodiments of the broad principles derived herein provide a printer, a control method, and a non-transitory computer-readable medium storing computer-readable instructions that contribute to an advantage of suppressing a deterioration in an atomizing performance of a transducer.

A first aspect of the present disclosure relates to a printer configured to perform printing using an inkjet head. The printer includes a container including a bottom surface and configured to store a liquid, a transducer configured to humidify air by causing the liquid stored in the container to vibrate, a first change mechanism including at least one of a first valve or a first pump, and configured to change a liquid level of the liquid stored in the container, using the at least one of the first valve or the first pump, a first sensor configured to output a first detection signal indicating that the liquid level reaches a first height, a processor, and a memory storing computer-readable instructions that, when executed by the processor, instruct the processor to perform processes. The processes include change processing of controlling the first change mechanism and changing the liquid level, and first maintaining processing of, after the change processing is performed, controlling the first change mechanism and maintaining the liquid level at a maintained position lower than the first height and higher than the bottom surface.

According to the first aspect, in the first maintaining processing, the processor maintains the liquid level at the maintained position. The maintained position is lower than the first height and thus the liquid level after the first maintaining processing has been performed is lower than the first height. As a result, compared to a case in which the liquid level is at the first height after the first maintaining processing, the processor contributes to an advantage of suppressing a state of deterioration in an atomizing performance of the transducer.

A second aspect of the present disclosure relates to a control method of a printer configured to perform printing using an inkjet head. The printer is provided with a container including a bottom surface and configured to store a liquid, a transducer configured to humidify air by causing the liquid stored in the container to vibrate, and a first change mechanism including at least one of a first valve or a first pump. The first change mechanism is configured to change a liquid level of the liquid stored in the container, using the at least one of the first valve or the first pump. The control method includes change processing of controlling the first change mechanism and changing the liquid level, and first maintaining processing of, after the change processing is performed, controlling the first change mechanism and maintaining the liquid level at a maintained position lower than a first height and higher than the bottom surface.

The second aspect contributes to the same advantage as the first aspect.

A third aspect of the present disclosure relates to a non-transitory computer-readable medium storing computer-readable instructions that, when executed by a computer of a printer configured to perform printing using an inkjet head, cause the computer to perform processes. The printer is provided with a container including a bottom surface and configured to store a liquid, a transducer configured to humidify air by causing the liquid stored in the container to vibrate, and a first change mechanism including at least one of a first valve or a first pump. The first change mechanism is configured to change a liquid level of the liquid stored in the container, using the at least one of the first valve or the first pump. The processes include change processing of controlling the first change mechanism and changing the liquid level, and first maintaining processing of, after the change processing is performed, controlling the first change mechanism and maintaining the liquid level at a maintained position lower than a first height and higher than the bottom surface.

The third aspect contributes to the same advantage as the first aspect.

Figure 1:
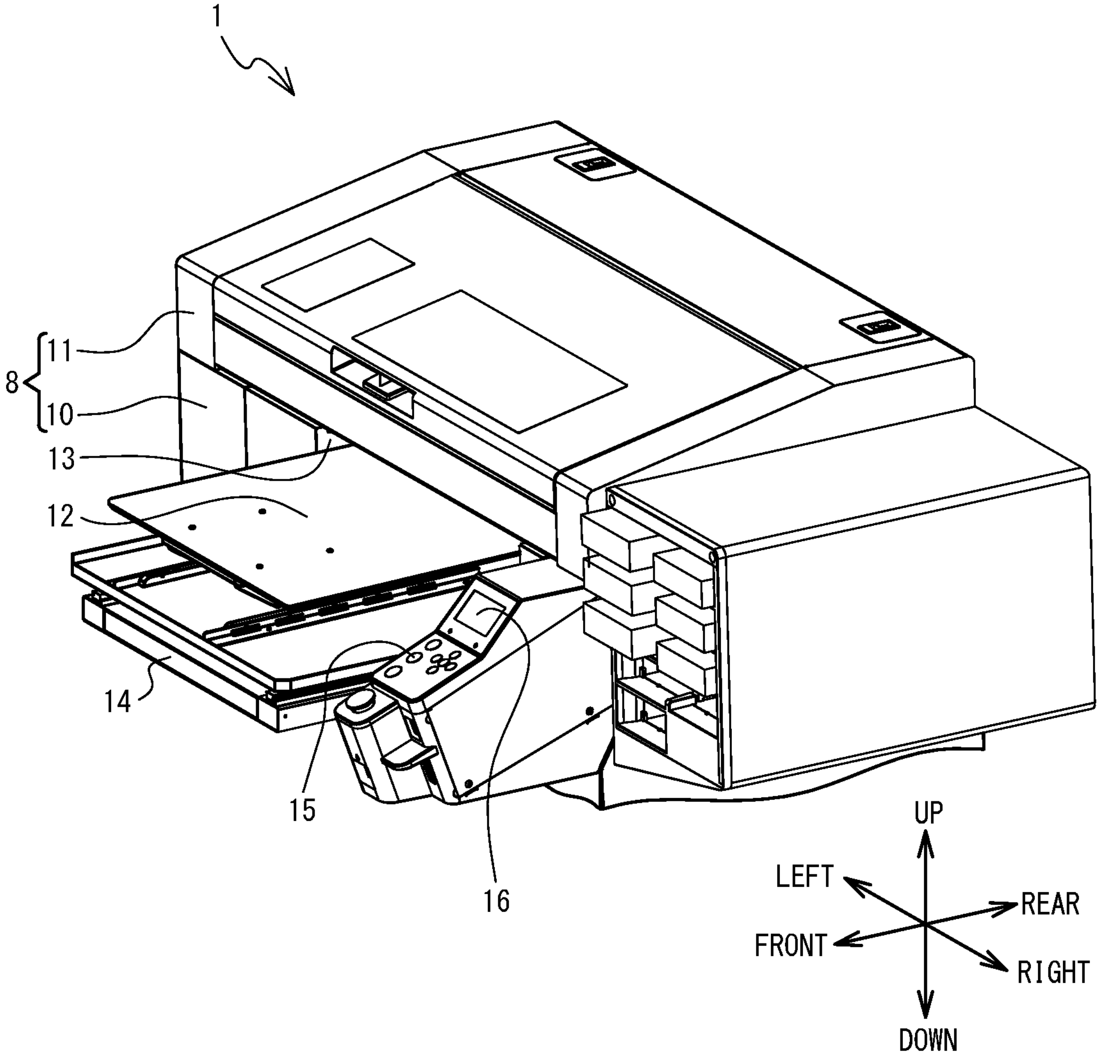
FIG. 1 is a perspective view of an upper portion of a printer.

With reference to the drawings, a printer 1 according to an embodiment of the present disclosure will be described. A lower left direction, an upper right direction, a lower right direction, an upper left direction, an upper direction, and a lower direction correspond to a front direction, a rear direction, a right direction, a left direction, an upper direction, and a lower direction of the printer 1, respectively. In the present embodiment, mechanical elements in the drawings are illustrated in accordance with an actual scale.

A printer 1 illustrated in FIG. 1 is an inkjet printer, and performs printing by discharging ink onto a print medium, such as cloth, paper, or the like. The printer 1 performs color printing on the print medium using white ink and color inks (black, yellow, cyan, and magenta inks).

The external configuration of the printer 1 will be described with reference to FIG. 1. The printer 1 is provided with a housing 8. The housing 8 is a cuboid shape, and is provided with a lower cover 10 and a lid 11. The lower cover 10 is a substantially U shape in a front view. An opening 13 is formed in the front surface of the lower cover 10. The opening 13 is rectangular in a front view, and is open in the front-rear direction and upward. The lid 11 is provided on the upper side of the lower cover 10, and opens and closes between a position of covering the upper surface of the lower cover 10 and a position of opening the upper surface of the lower cover 10, by rotating using the rear end of the lid 11 as an axis. Hereinafter, a space encompassed by the left surface, the right surface, and the bottom surface of the lower cover 10 and the lid 11 is referred to as an "interior of the housing 8."

Of the front surface of the lower cover 10, operation buttons 15 and a display screen 16 are provided to the right of the opening 13. The operation buttons 15 input various information into the printer 1 in accordance with an operation by an operator. The display screen 16 displays various information.

A platen 12 is disposed in the opening 13. The platen 12 is plate-shaped, and is supported from below by a support portion 14 so as to be movable in the front-rear direction. The support portion 14 is fixed to a frame body 2 illustrated in FIG. 2, inside the opening 13. As a result of driving of a sub-scanning motor 121 illustrated in FIG. 5, the platen 12 moves in the front-rear direction between an exterior of the housing 8 and the interior of the housing 8, via the opening 13. Thus, in the present embodiment, the front-rear direction is a sub-scanning direction.

Figure 2:
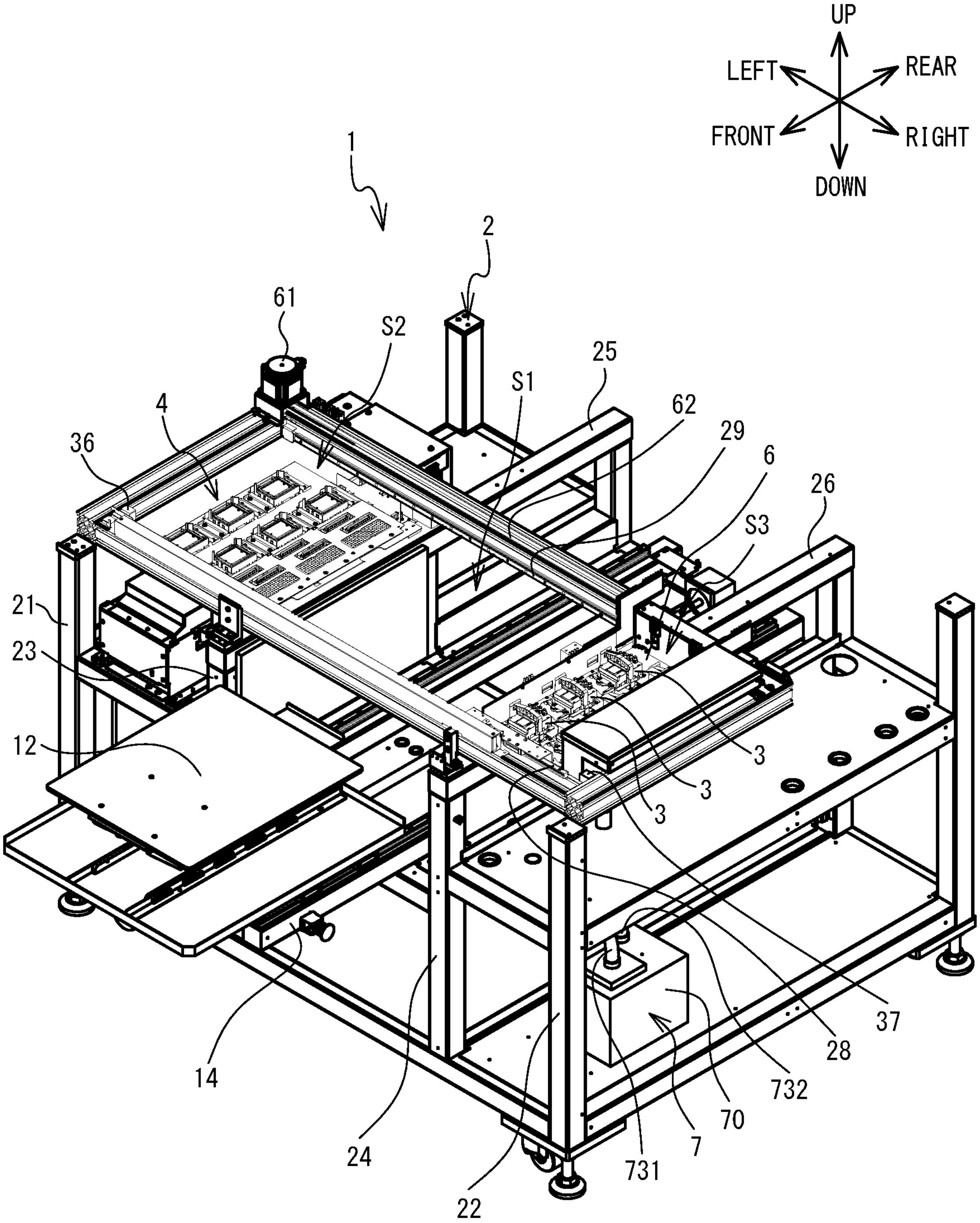
FIG. 2 is a perspective view illustrating an internal structure of the printer.

The internal structure of the printer 1 will be described with reference to FIG. 2 and FIG. 3. As illustrated in FIG. 2, the frame body 2 is provided in the interior of the housing 8 illustrated in FIG. 1. The frame body 2 is configured by a plurality of shafts in a lattice shape, and includes shafts 21, 22, 23, 24, 25, and 26.

The shaft 21 is provided at the left end of the frame body 2, and extends in the up-down direction. The shaft 22 is provided at the right end of the frame body 2, and extends in the up-down direction. The shaft 23 is provided at a position between the center of the frame body 2 and the shaft 21 in the left-right direction, and extends in the up-down direction. The shaft 24 is provided between the center of the frame body 2 and the shaft 22 in the left-right direction, and extends in the up-down direction. The shaft 25 extends rearward from the upper end of the shaft 23. The shaft 26 extends rearward from the upper end of the shaft 24.

A pair of guide rails 28 and 29 are fixed to the shafts 25 and 26. The guide rail 28 is positioned at the front ends of each of the shafts 25 and 26, and extends in the left-right direction from the shaft 21 to the shaft 22. The guide rail 29 is disposed substantially in the center, in the front-rear direction, of the frame body 2, and extends in the left-right direction from the shaft 21 to the shaft 22.

The guide rails 28 and 29 support a carriage 6. The carriage 6 is plate-shaped, and extends from the guide rail 28 to the guide rail 29. One or a plurality of heads 3 are mounted on the carriage 6. In the present embodiment, two rows, each constituted by three of the heads 3 being aligned in the front-rear direction, are aligned in the left-right direction. In FIG. 2, the row of the heads 3 disposed on the left is illustrated. The head 3 is an inkjet head, and has a cuboid shape.

Figure 3:
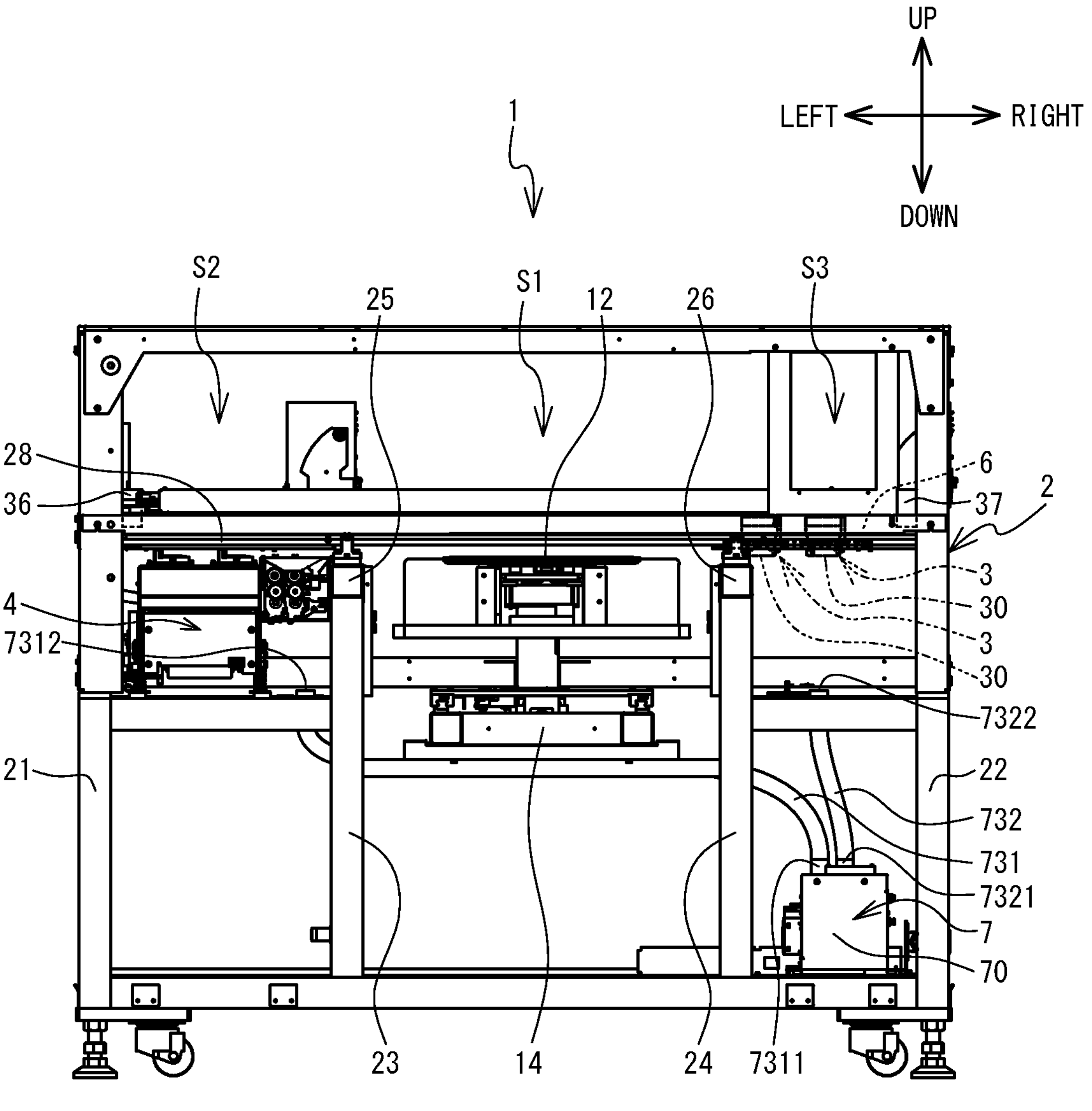
FIG. 3 is a front view illustrating the internal structure of the printer.

As illustrated in FIG. 3, the head 3 includes a lower surface 30. The lower surface 30 is exposed downward from the carriage 6. The lower surface 30 is disposed higher than the platen 12. A plurality of nozzles (not illustrated) are formed in the lower surface 30. As a result of being driven by a head drive portion 31 illustrated in FIG. 5, the head 3 discharges the ink from the plurality of nozzles. The head drive portion 31 is a piezoelectric element or a heater element. In the present embodiment, one of the plurality of heads 3 discharges white ink from the plurality of nozzles. Any one of the plurality of heads 3 discharges color ink from the plurality of nozzles. The head 3 may discharge, from the plurality of nozzles, a liquid such as a special ink, a pretreatment agent, a post-treatment agent, a discharge agent, or the like.

As illustrated in FIG. 2, a maintenance mechanism 4 is provided between the shaft 21 and the shaft 23, in the left-right direction. The maintenance mechanism 4 includes a cap, a wiper, a flushing box, and the like. In the maintenance mechanism 4, capping of the lower surface 30 by the cap, wiping of the lower surface 30 by the wiper, flushing into the flushing box by the head 3, and the like are performed.

A rear end portion of the carriage 6 is coupled to one end of a drive belt 62. The drive belt 62 extends in the left-right direction. The other end of the drive belt 62 is coupled to a main scanning motor 61. The main scanning motor 61 is provided at the left end of the guide rail 29. As a result of the main scanning motor 61 being driven, the drive belt 62 moves the carriage 6 in the left-right direction along the shafts 21 and 22. Thus, in the present embodiment, the left-right direction is a main scanning direction.

As illustrated in FIG. 3, a movement range of the carriage 6 in the left-right direction is between each of the left end and the right end of the guide rail 28 and the guide rail 29 illustrated in FIG. 2. FIG. 3 illustrates a state in which the carriage 6 is positioned at the right end of the movement range (this also applies to FIG. 2). Hereinafter, in the interior of the housing 8 illustrated in FIG. 1, a space including a region in which a movement path of the carriage 6 and a movement path of the platen 12 overlap each other in a plan view will be referred to as a "printing space S1." In the interior of the housing 8, the printing space S1 is a space between the shaft 23 and the shaft 24 in a front view.

In the interior of the housing 8 illustrated in FIG. 1, of the movement path of the carriage 6 in a plan view, a space further to the left than the printing space S1 will be referred to as a "maintenance space S2." In the interior of the housing 8, the maintenance space S2 is space between the shaft 21 and the shaft 23 in a front view. In the interior of the housing 8 illustrated in FIG. 1, of the movement path of the carriage 6 in a plan view, a space further to the right than the printing space S1 will be referred to as a "stand-by space S3." In the interior of the housing 8, the stand-by space S3 is a space between the shaft 22 and the shaft 24 in a front view.

The printer 1 performs maintenance of the plurality of heads 3, using the maintenance mechanism 4, in a state in which the carriage 6 is disposed in the maintenance space S2. When the printer 1 is not performing a printing operation by the printer 1, and is not performing the maintenance by the maintenance mechanism 4, the carriage 6 stands by in a state of being disposed at the stand-by space S3.

The printer 1 performs printing in a state in which the carriage 6 and the platen 12 are disposed in the printing space S1. Accordingly, the printer 1 drives the sub-scanning motor 121 and the main scanning motor 61 illustrated in FIG. 5. The platen 12 moves in the front-rear direction (the sub-scanning direction) as a result of being driven by the sub-scanning motor 121. The carriage 6 moves in the left-right direction (the main scanning direction) as a result of being driven by the main scanning motor 61. In this way, the print medium is conveyed in the front-rear direction and the left-right direction with respect to the plurality of heads 3.

Figure 5:
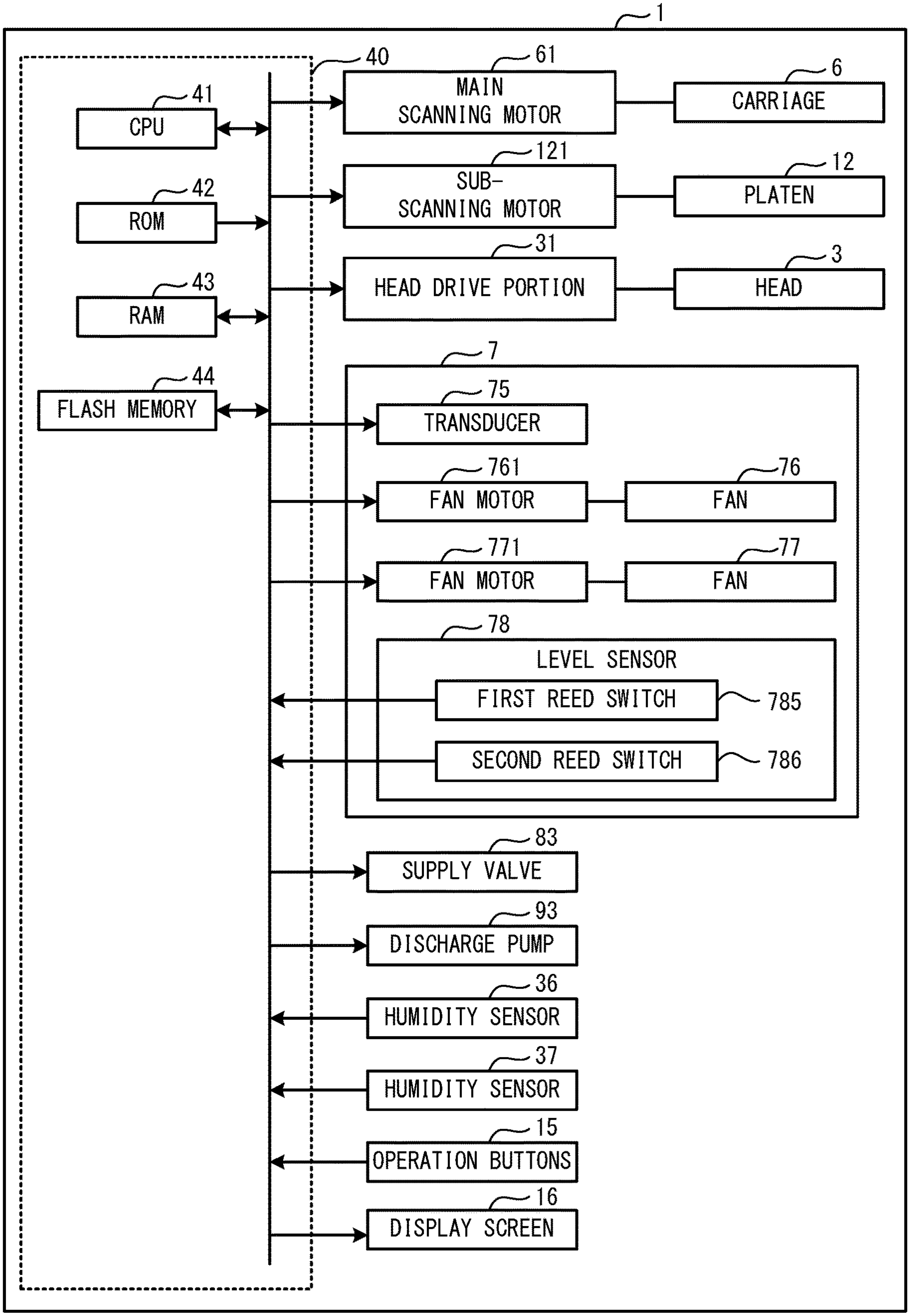
FIG. 5 is a block diagram illustrating an electrical configuration of the printer.

For example, the printer 1 drives the head drive portion 31 illustrated in FIG. 5 while conveying the print medium in the left-right direction with respect to the plurality of heads 3, and discharges the ink from the plurality of heads 3. Subsequently, the printer 1 moves the print medium in the front-rear direction with respect to the plurality of heads 3. By repeating these operations, the printing is performed on the print medium.

Figure 4:
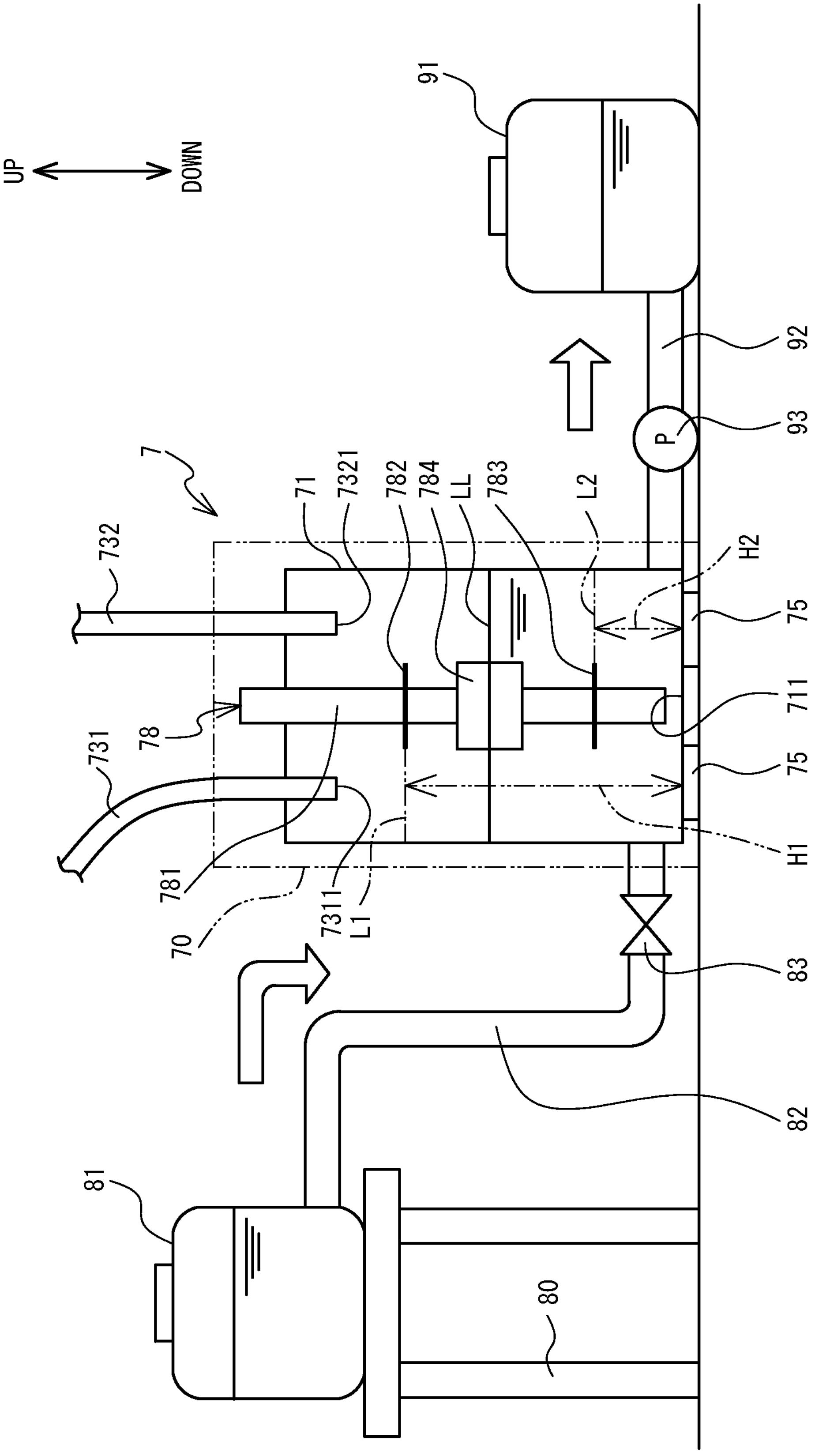
FIG. 4 is a configuration diagram of flow paths between each of a supply tank and a discharge tank, and a humidifier.

The printer 1 is further provided with a humidifier 7. The humidifier 7 is disposed at the lower right of the printer 1, and humidifies air using an ultrasonic method. As illustrated in FIG. 4, the humidifier 7 is provided with a container 71, a level sensor 78, a transducer 75, tubes 731 and 732, fan 76 and 77 (refer to FIG. 5), and fan motors 761 and 771 (refer to FIG. 5).

The container 71 is a cuboid tank, and is covered by a cover 70. The container 71 includes a bottom surface 711. The bottom surface 711 is positioned at the lower end of the container 71, and extends in the front-rear direction and the left-right direction. A liquid is stored in the container 71. The liquid is not limited to a particular substance, and is water in the present embodiment.

Hereinafter, a level of a liquid surface inside the container 71 will be referred to as a "liquid level LL," and an "upper limit level L1" and a "lower limit level L2" are defined. In the up-down direction, the liquid level LL is a height from the bottom surface 711 of the container 71 to the liquid surface inside the container 71. The upper limit level L1 is a level at which the height from the bottom surface 711 of the container 71 is a height H1. The upper limit level L1 is not limited to a particular level, and is, for example, a level at which an amount of the liquid inside the container 71 is full or is close to being full.

The lower limit level L2 is a level at which the height from the bottom surface 711 of the container 71 is a height H2, and is a level higher than the bottom surface 711 of the container 71. The height H2 is lower than the height H1. The lower limit level L2 is not limited to a particular level but is, for example, a level when the amount of liquid inside the container 71 is an amount of liquid at which it becomes difficult to atomize the liquid inside the container 71 using the transducer 75 to be described later.

The level sensor 78 is provided inside the container 71, detects when the liquid level LL is equal to or greater than the upper limit level L1, and detects when the liquid level LL is equal to or lower than the lower limit level L2. The level sensor 78 includes a shaft 781, an upper limit stopper 782, a lower limit stopper 783, and a float 784. The shaft 781 extends in the up-down direction, and is fixed to the container 71.

The upper limit stopper 782 is provided at a position of the upper limit level L1, and is fixed to the shaft 781. The upper limit stopper 782 protrudes outward in a radial direction from the shaft 781, and regulates the float 784 (to be described later) from moving higher than the upper limit stopper 782. The lower limit stopper 783 is provided at a position of the lower limit level L2, and is fixed to the shaft 781. The lower limit stopper 783 is located at a position separated downward from the upper limit stopper 782. The lower limit stopper 783 protrudes outward in the radial direction from the shaft 781, and regulates the float 784 (to be described later) from moving lower than the lower limit stopper 783.

As will be described in detail later, the level sensor 78 detects the liquid level LL using the magnetic force of a magnet (to be described later) inside the float 784. Thus, if a space between the upper limit stopper 782 and the lower limit stopper 783 is extremely narrow, for example, the magnet inside the float 784 malfunctions, and there is a possibility that the height of the liquid level LL may be mistakenly detected by the level sensor 78. Thus, it is difficult to configure the level sensor 78 in which the upper limit stopper 782 and the lower limit stopper 783 are caused to be closer together. Therefore, in the present embodiment, the upper limit stopper 782 and the lower limit stopper 783 are separated from each other in the up-down direction by a distance at which the magnet will not malfunction.

The float 784 includes the magnet (not illustrated), and a first reed switch 785 and a second reed switch 786 illustrated in FIG. 5, and is supported by the shaft 781. The float 784 moves in the up-down direction along the shaft 781 between the upper limit stopper 782 and the lower limit stopper 783. The float 784 floats on the liquid (the water in the present embodiment) inside the container 71. Thus, the float 784 rises in accordance with a rise in the liquid level LL and falls in accordance with a fall in the liquid level LL.

When the liquid level LL is lower than the upper limit level L1 and is higher than the lower limit level L2, the float 784 is separated downward from the upper limit stopper 782, and is separated upward from the lower limit stopper 783. When the liquid level LL becomes equal to or higher than the upper limit level L1, the float 784 comes into contact, from below, with the upper limit stopper 782. As a result, the upper limit stopper 782 regulates the float 784 from moving higher than the upper limit stopper 782. When the liquid level LL becomes equal to or lower than the lower limit level L2, the float 784 comes into contact, from above, with the lower limit stopper 783. As a result, the lower limit stopper 783 regulates the float 784 from moving lower than the lower limit stopper 783.

The transducer 75 is provided at the bottom surface 711 of the container 71. The transducer 75 converts an electric energy input to the transducer 75 into ultrasonic vibrations. As a result of the transducer 75 ultrasonically vibrating, the liquid inside the container 71 vibrates from the bottom surface 711, and is atomized from the liquid surface. In this way, the air inside the container 71 is humidified.

First ends 7311 and 7321 of the tubes 731 and 732, respectively, are connected to an upper portion of the container 71. As illustrated in FIG. 3, a second end 7312 of the tube 731 is disposed in the maintenance space S2. A second end 7322 of the tube 732 is disposed in the stand-by space S3.

The fan 76 illustrated in FIG. 5 is provided in the tube 731. As a result of the fan 76 rotating, an air flow is generated from the container 71 toward the maintenance space S2 via the tube 731. The fan 77 illustrated in FIG. 5 is provided in the tube 732. As a result of the fan 77 rotating, an air flow is generated from the container 71 toward the stand-by space S3 via the tube 732. The fan motors 761 and 771 illustrated in FIG. 5 respectively rotate the fans 76 and 77 as a result of being driven.

As illustrated in FIG. 4, in the present embodiment, the container 71 is connected to a supply tank 81 via a supply tube 82. Note that a public water supply (not illustrated) may be connected to the container 71 via the supply tube 82. The liquid to be supplied to the container 71 (the water in the present embodiment) is stored in the supply tank 81. The supply tank 81 is disposed on a base 80. Accordingly, the supply tank 81 is disposed at a position higher than the bottom surface 711 of the container 71.

A supply valve 83 is provided in the supply tube 82. The supply valve 83 is switched between an open state and a closed state by a solenoid, for example. In the open state, the supply valve 83 allows the liquid to flow in the supply tube 82 via the supply valve 83. In the closed state, the supply valve 83 blocks the liquid from flowing in the supply tube 82 via the supply valve 83.

As described above, in the present embodiment, the supply tank 81 is disposed at a position higher than the bottom surface 711 of the container 71. Thus, when the supply valve 83 is in the open state, due to the water head difference between the liquid inside the supply tank 81 and the liquid inside the container 71, the liquid is supplied to the container 71 from the supply tank 81 via the supply tube 82. When the supply valve 83 is in the closed state, the liquid is not supplied to the container 71 from the supply tank 81 via the supply tube 82.

Furthermore, a discharge tank 91 is connected to the container 71 via a discharge tube 92. The liquid discharged from the container 71 (the water in the present embodiment) is stored in the discharge tank 91. A discharge pump 93 is provided in the discharge tube 92. The liquid is discharged from the container 71 to the discharge tank 91 via the discharge tube 92 by the driving of the discharge pump 93. In a state in which the driving of the discharge pump 93 is stopped, the liquid is not discharged from the container 71 to the discharge tank 91 via the discharge tube 92.

A humidifying operation by the humidifier 7 will be described with reference to FIG. 3. In the humidifying operation, the transducer 75 illustrated in FIG. 4 is driven, and one or both of the fan motors 761 or 771 illustrated in FIG. 5 are driven. By the driving of the transducer 75, the air inside the container 71 illustrated in FIG. 4 is humidified. By the driving of the fan motor 761, the fan 76 illustrated in FIG. 5 rotates. In this way, the humidified air inside the container 71 is sent to the maintenance space S2 via the tube 731. Thus, the air inside the maintenance space S2 is humidified. By the driving of the fan motor 771, the fan 77 illustrated in FIG. 5 rotates. In this way, the humidified air inside the container 71 is sent to the stand-by space S3 via the tube 732. Thus, the air inside the stand-by space S3 is humidified.

The humidified air inside the maintenance space S2 and the humidified air inside the stand-by space S3 are, respectively, sent to the printing space S1 by a fan (not illustrated) provided at a predetermined position in the interior of the housing 8 illustrated in FIG. 1. In this way, the interior of the housing 8 as a whole is humidified. Thus, in the present embodiment, in whichever of the printing space S1, the maintenance space S2, or the stand-by space S3 the carriage 6 is disposed, air that has not been humidified by the humidifier 7 is suppressed from coming into contact with the heads 3 illustrated in FIG. 3.

With reference to FIG. 3, an electrical configuration of the printer 1 will be described. The printer 1 is provided with a control board 40. A CPU 41, a ROM 42, a RAM 43, and a flash memory 44 are provided at the control board 40. The CPU 41 controls the printer 1, and is electrically connected to the ROM 42, the RAM 43, and the flash memory 44. The ROM 42 stores a control program for controlling operations of the printer 1, information necessary for the CPU 41 to execute various programs, and the like. The RAM 43 temporarily stores various data and the like used in the control program. The flash memory 44 is non-volatile, and stores print data for performing printing, and the like.

The main scanning motor 61, the sub-scanning motor 121, the head drive portion 31, the transducer 75, the fan motors 761 and 771, the first reed switch 785, the second reed switch 786, the supply valve 83, the discharge pump 93, humidity sensors 36 and 37, the operation buttons 15, and the display screen 16 are electrically connected to the CPU 41. The main scanning motor 61, the sub-scanning motor 121, the head drive portion 31, the transducer 75, the fan motors 761 and 771, the supply valve 83, the discharge pump 93, and the display screen 16 are driven under control of the CPU 41.

The operation buttons 15 output a signal, to the CPU 41, in accordance with an operation by a user. The humidity sensor 36 is provided in the maintenance space S2, and, in the present embodiment, is positioned at the left end of the guide rail 28 (refer to FIG. 3). The humidity sensor 36 detects the humidity in the maintenance space S2, and outputs, to the CPU 41, a signal corresponding to the detected humidity. The humidity sensor 37 is provided in the stand-by space S3, and, in the present embodiment, is positioned at the right end of the guide rail 28 (refer to FIG. 3). The humidity sensor 37 detects the humidity in the stand-by space S3, and outputs, to the CPU 41, a signal corresponding to the detected humidity.

The level sensor 78 outputs, to the CPU 41, a detection signal corresponding to the liquid level LL. Specifically, in the level sensor 78, when the float 784 is not in contact with either of the upper limit stopper 782 or the lower limit stopper 783, the first reed switch 785 and the second reed switch 786 are both OFF and are not conductive. Thus, the level sensor 78 does not output the detection signal to the CPU 41.

In the level sensor 78, when the float 784 is in contact with the upper limit stopper 782, the first reed switch 785 is turned ON by the action of the magnetic force of the magnet inside the float 784, and is conductive. In this way, the level sensor 78 outputs, to the CPU 41, the detection signal (hereinafter referred to as an "upper limit signal") indicating that the liquid level LL is equal to or greater than the upper limit level L1. When, for example, in a state in which the CPU 41 is not receiving the upper limit signal from the level sensor 78, the CPU 41 receives the upper limit signal from the level sensor 78, the CPU 41 detects that the liquid level LL has increased from the state of being lower than the upper limit level L1 and has reached the upper limit level L1.

In the level sensor 78, when the float 784 is in contact with the lower limit stopper 783, the second reed switch 786 is turned ON by the action of the magnetic force of the magnet inside the float 784, and is conductive. In this way, the level sensor 78 outputs, to the CPU 41, the detection signal (hereinafter referred to as a "lower limit signal") indicating that the liquid level LL is equal to or lower than the lower limit level L2. When, for example, in a state in which the CPU 41 is not receiving the lower limit signal from the level sensor 78, the CPU 41 receives the lower limit signal from the level sensor 78, the CPU 41 detects that the liquid level LL has fallen from the state of being higher than the lower limit level L2 and has reached the lower limit level L2. When, for example, in a state in which the CPU 41 is receiving the lower limit signal from the level sensor 78, the CPU 41 no longer receives the lower limit signal, the CPU 41 detects that the liquid level LL has risen from the lower limit level L2 or from the state of being lower than the lower limit level L2 and has become higher than the lower limit level L2.

Figure 6:
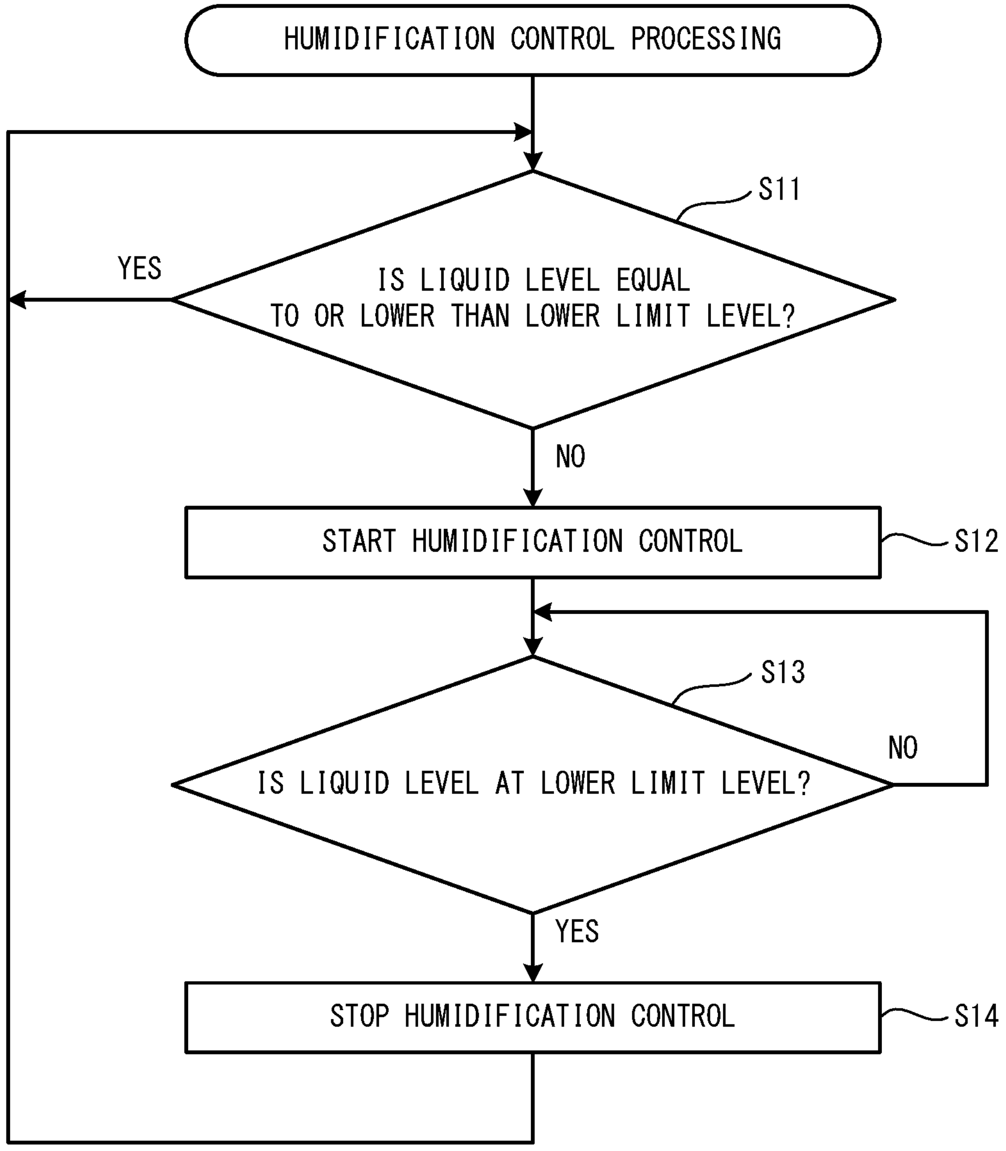
FIG. 6 is a flowchart of humidification control processing.

Humidification control processing will be described with reference to FIG. 6. When a power supply to the printer 1 is turned on, the CPU 41 performs the humidification control processing, by reading out and operating a control program from the ROM 42.

When the humidification control processing is started, the CPU 41 determines whether or not the liquid level LL illustrated in FIG. 3 is equal to or lower than the lower limit level L2, based on the lower limit signal from the level sensor 78 illustrated in FIG. 4 (S11). The liquid level LL may be equal to or lower than the lower limit level L2 when the humidification control processing is started, for example. For example, the liquid level LL becomes equal to or lower than the lower limit level L2 during execution of the humidification control processing as a result of humidification control to be described later. In these cases, the level sensor 78 outputs the lower limit signal to the CPU 41. When the CPU 41 is receiving the lower limit signal from the level sensor 78, the CPU 41 determines that the liquid level LL is equal to or lower than the lower limit level L2 (yes at S11). In this case, based on the lower limit signal from the level sensor 78, the CPU 41 repeats the determination at S11 until the liquid level LL becomes higher than the lower limit level L2.

For example, when the liquid level LL illustrated in FIG. 4 falls to the lower limit level L2 due to the humidification operation, by performing the supply of the liquid to the container 71 by supply processing to be described below, the liquid level LL rises. For example, by performing the supply of the liquid to the container 71 by initial introduction processing or replacement processing to be described later, the liquid level LL rises from being equal to or lower than the lower limit level L2. When the liquid level LL becomes higher than the lower limit level L2, the level sensor 78 stops the output of the lower limit signal to the CPU 41. When the CPU 41 does not receive the lower limit signal from the level sensor 78, the CPU 41 determines that the liquid level LL is higher than the lower limit level L2 (no at S11). In this case, the CPU 41 starts the humidification control (S12). In the humidification control, the CPU 41 controls the humidification operation.

An example of the humidification control will be described. Based on a detection signal from the humidity sensor 36 illustrated in FIG. 5, the CPU 41 determines whether the humidity in the maintenance space S2 illustrated in FIG. 3 is exceeding a reference humidity. When the humidity in the maintenance space S2 is lower than the reference humidity, the CPU 41 operates the transducer 75 illustrated in FIG. 4 and drives the fan motor 761 illustrated in FIG. 5, until the humidity in the maintenance space S2 exceeds the reference humidity. When the humidity in the maintenance space S2 has exceeded the reference humidity, the CPU 41 stops the driving of the transducer 75 and stops the driving of the fan motor 761.

Based on a detection signal from the humidity sensor 37 illustrated in FIG. 5, the CPU 41 determines whether the humidity in the stand-by space S3 illustrated in FIG. 3 is exceeding the reference humidity. When the humidity in the stand-by space S3 is lower than the reference humidity, the CPU 41 operates the transducer 75 illustrated in FIG. 4 and drives the fan motor 771 illustrated in FIG. 5, until the humidity in the stand-by space S3 exceeds the reference humidity. When the humidity in the stand-by space S3 has exceeded the reference humidity, the CPU 41 stops the driving of the transducer 75 and stops the driving of the fan motor 771.

The reference humidity is stored in the ROM 42 or the flash memory 44, and is established in accordance with a likelihood or the like of the ink discharge failure by the heads 3 illustrated in FIG. 3. For example, when the humidity in the maintenance space S2 is higher than the reference, the ink discharge failure by the heads 3 is less likely to occur, compared to when the humidity in the maintenance space S2 is lower than the reference humidity.

In the humidification control, when the distance from the transducer 75 to the liquid level inside the container 71 is large, there is a possibility that the atomizing performance of the transducer 75 may have deteriorated. In the present embodiment, by performing the supply control processing to be described later, the CPU 41 suppresses the humidification control from being performed in a state in which the liquid level LL is at the upper limit level L1, that is, in the state in which the atomizing performance of the transducer 75 has deteriorated.

The description will return to the humidification control processing. For example, the liquid level LL illustrated in FIG. 4 falls due to the humidification control started by the processing at S12. Based on the detection signal from the level sensor 78 illustrated at FIG. 4, the CPU 41 determines whether the liquid level LL illustrated in FIG. 4 has reached the lower limit level L2 (S13). When the liquid level LL is higher than the lower limit level L2 (no at S13), the CPU 41 repeats the determination at S13 until the liquid level LL reaches the lower limit level L2. Accordingly, the CPU 41 continues the humidification control started by the processing at S12 until the liquid level LL reaches the lower limit level L2.

When the liquid level LL has reached the lower limit level L2 (yes at S13), the CPU 41 stops the humidification control (S14). In this way, the humidification operation is stopped. The CPU 41 returns the processing to the determination at S11. In this case, when, due to the supply of the liquid to the container 71 illustrated in FIG. 4, the liquid level LL becomes higher than the lower limit level L2 (no at S11), the CPU 41 re-starts the humidification control (S12).

Figure 7:
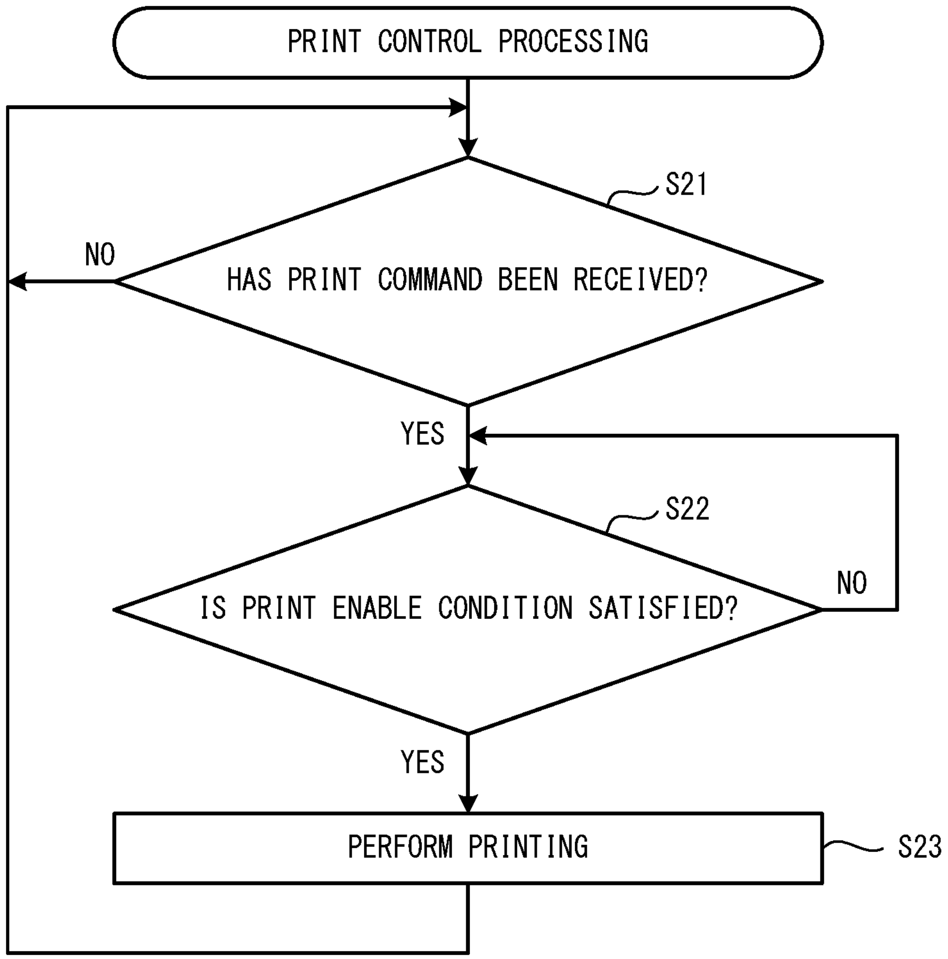
FIG. 7 is a flowchart of print control processing.

The print control processing will be described with reference to FIG. 7. When the power supply to the printer 1 is turned on, the CPU 41 performs the print control processing in parallel to the humidification control processing, by reading out and operating a control program from the ROM 42.

When the print control processing is started, based on a signal from the operation buttons 15 illustrated in FIG. 1, the CPU 41 determines whether a print command for starting the printing by the printer 1 has been received (S21). When the CPU 41 has not received the print command (no at S21), the CPU 41 repeats the determination at S21 until the print command is received.

When the CPU 41 has received the print command (yes at S21), based on the detection signal from the humidity sensor 36 and the detection signal from the humidity sensor 37 illustrated in FIG. 5, the CPU 41 determines whether a print enable condition is satisfied (S22). In the present embodiment, based on the detection signal from the humidity sensor 36, the CPU 41 determines whether the humidity in the maintenance space S2 illustrated in FIG. 3 is within a reference humidity range. Based on the detection signal from the humidity sensor 37, the CPU 41 determines whether the humidity in the stand-by space S3 illustrated in FIG. 3 is within the reference humidity range. The reference humidity ranges are stored in the ROM 42 or the flash memory 44, and are established in accordance with the likelihood or the like of the ink discharge failure by the heads 3 illustrated in FIG. 3. A lower limit of the reference humidity range is lower than the reference humidity. An upper limit of the reference humidity range is higher than the reference humidity.

When one or both of the humidity in the maintenance space S2 or the humidity in the stand-by space S3 are not within the reference humidity range, the CPU 41 determines that the print enable condition is not satisfied (no at S22). In this case, the CPU 41 repeats the determination at S22 until the print enable condition is satisfied. For example, when the humidity in the maintenance space S2 is lower than the lower limit of the reference humidity range, the CPU 41 repeats the determination at S22 until the humidity in the maintenance space S2 becomes higher than the lower limit of the reference humidity range due to the humidification control started by the processing at S12 (refer to FIG. 6).

When both the humidity in the maintenance space S2 and the humidity in the stand-by space S3 are within the reference humidity range, the CPU 41 determines that the print enable condition is satisfied (yes at S22). In this case, the CPU 41 controls the main scanning motor 61, the sub-scanning motor 121, and the head drive portion 31 illustrated in FIG. 5, and performs the printing by the printer 1 (S23). When the printing ends, the CPU 41 returns the processing to the determination at S21.

The supply control processing will be described with reference to FIG. 8. When the power supply to the printer 1 is turned on, the CPU 41 performs the supply control processing in parallel to each of the humidification control processing and the print control processing, by reading out and operating a control program from the ROM 42.

When the supply control processing is started, based on a signal from the operation buttons 15 illustrated in FIG. 1, the CPU 41 determines whether an initial introduction command for performing initial introduction has been received (S31). The initial introduction is an operation to supply the liquid, via the supply tube 82, from the supply tank 81 to the empty container 71, for example (refer to FIG. 4). Thus, when the liquid is not stored in the container 71, such as when initially installing the container 71 for the printer 1, when replacing the container 71, and the like, the user inputs the initial introduction command to the printer 1, via the operation buttons 15. In the present embodiment, "the container 71 is empty" includes when there is no liquid at all in the container 71, and when there is substantially no liquid in the container 71. The state in which there is substantially no liquid in the container 71 refers to a state in which the liquid is present in the container 71 where the liquid level LL is lower than the lower limit level L2.

When the CPU 41 has received the initial introduction command (yes at S31), the CPU 41 performs the initial introduction processing (S32). As will be described in detail later, initial introduction is controlled in the initial introduction processing. The CPU 41 returns the processing to the determination at S31. When the CPU 41 has not received the initial introduction command (no at S31), based on a signal from the operation buttons 15, the CPU 41 determines whether a replacement command for performing a replacement operation has been received (S33). The replacement operation is an operation to replace the liquid stored in the container 71. Thus, when foreign matter has entered into the container 71, when the liquid in the container 71 has degenerated, or the like, or periodically, the user inputs the replacement command to the printer 1 via the operation buttons 15.

When the CPU 41 has received the replacement command (yes at S33), the CPU 41 performs the replacement operation (S34). As will be described in detail later, the replacement operation is controlled in the replacement processing. The CPU 41 returns the processing to the determination at S31. When the CPU 41 has not received the replacement command (no at S33), the CPU 41 performs the supply processing (S35). As will be described in detail later, in the supply processing, the supply of the liquid from the supply tank 81 to the container 71 via the supply tube 82 is controlled. The CPU 41 returns the processing to the determination at S31.

Figure 9:
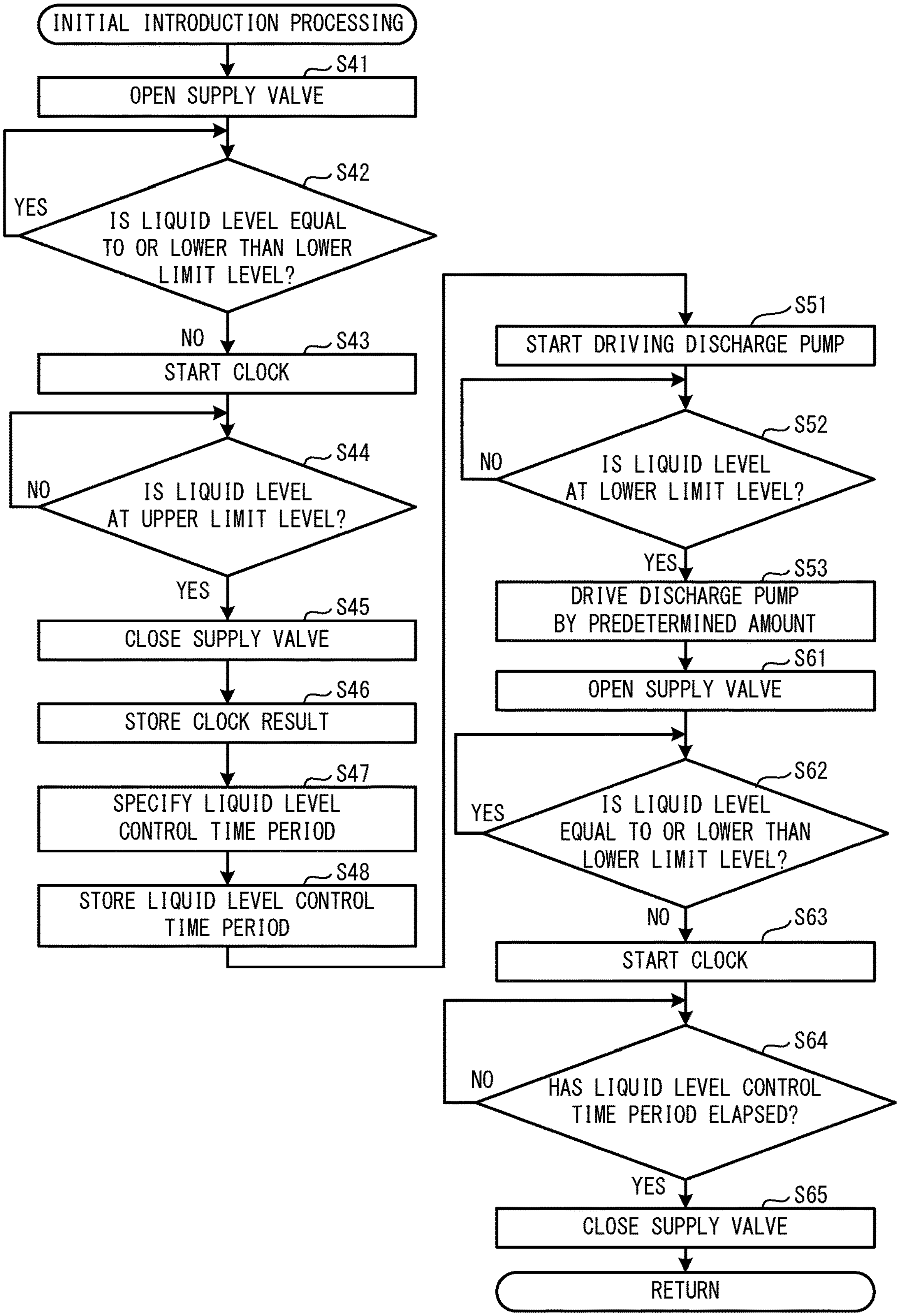
FIG. 9 is a flowchart of initial introduction processing.
Figure 10:
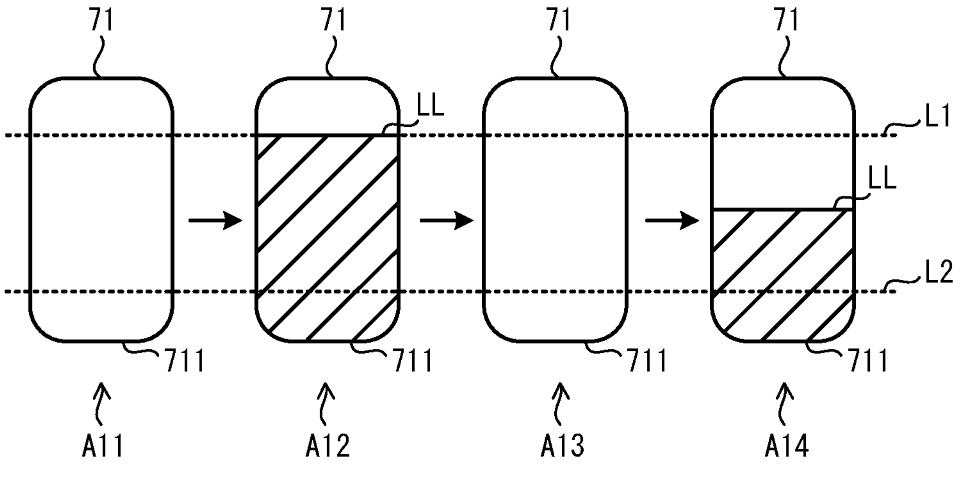
FIG. 10 is a state transition chart of a liquid level when the initial introduction processing is executed.

The initial introduction processing will be described with reference to FIG. 9 and FIG. 10. At a time at which the initial introduction processing is started, as illustrated by a state A11 (refer to FIG. 10), the container 71 is empty, for example. As illustrated in FIG. 9, when the initial introduction processing is started, the CPU 41 switches the supply valve 83 illustrated in FIG. 4 from the closed state to the open state (S41). In this way, the supply of the liquid from the supply tank 81 illustrated in FIG. 4 to the container 71 via the supply tube 82 is started, and the liquid level LL rises.

Based on the lower limit signal from the level sensor 78 illustrated in FIG. 4, the CPU 41 determines whether the liquid level LL illustrated in FIG. 4 is equal to or lower than the lower limit level L2 (S42). When the CPU 41 is receiving the lower limit signal from the level sensor 78, the CPU 41 determines that the liquid level LL is still equal to or lower than the lower limit level L2 (yes at S42). In this case, the CPU 41 repeats the determination at S42 until the liquid level LL exceeds the lower limit level L2.

When the CPU 41 no longer receives the lower limit signal from the level sensor 78, the CPU 41 determines that the liquid level LL is higher than the lower limit level L2 (no at S42). In this case, the CPU 41 starts a clock (S43). A clock method is not limited to any particular method, and a value of a timer counter is stored in the RAM 43, for example. The CPU 41 starts a counting up of the value of the timer counter.

Based on an upper limit signal from the level sensor 78 illustrated in FIG. 4, the CPU 41 determines whether the liquid level LL illustrated in FIG. 4 has reached the upper limit level L1 (S44). When the CPU 41 is not receiving the upper limit signal from the level sensor 78, the CPU 41 determines that the liquid level LL is lower than the upper limit level L1 (no at S44). In this case, the CPU 41 repeats the determination at S44 until the liquid level LL reaches the upper limit level L1.

When the CPU 41 receives the upper limit signal from the level sensor 78, the CPU 41 determines that the liquid level LL has reached the upper limit level L1 (yes at S44). In this case, the CPU 41 switches the supply valve 83 illustrated in FIG. 4 from the open state to the closed state (S45). In this way, the supply of the liquid to the container 71 via the supply tube 82 from the supply tank 81 illustrated in FIG. 4 is stopped, and, as illustrated by a state A12 (refer to FIG. 10), the liquid level LL is maintained at the upper limit level L1.

The CPU 41 stores, in the RAM 43, a result of the clock started by the processing at S43 (S46). In other words, in the present embodiment, the CPU 41 stores, in the RAM 43, a time period from a time at which the liquid level LL rises and exceeds the lower limit level L2 to a time at which the liquid level LL reaches the upper limit level L1. The CPU 41 specifies a liquid level control time period, based on the clock result (S47).

Note that, in the present embodiment, "the time at which the liquid level LL exceeds the lower limit level L2" refers to a time at which the level sensor 78 switches from a state of outputting the lower limit signal to a state of not outputting the lower limit signal. "The time at which the liquid level LL reaches the upper limit level L1" refers to a time at which the level sensor 78 switches from a state of not outputting the upper limit signal to a state of outputting the upper limit signal.

The liquid level control time period is a parameter used, in processing from S65 to S86 to be described later, for maintaining the liquid level LL at a level between the upper limit level L1 and the lower limit level L2. In the present embodiment, the liquid level control time period is a length obtained by multiplying a time period from the time at which the liquid level LL exceeds the lower limit level L2 to the time at which the liquid level LL reaches the upper limit level L1 by a predetermined coefficient. The predetermined coefficient is not limited to a particular value, and in the present embodiment, is 0.5, which is larger than zero and smaller than 1. Thus, in the present embodiment, the liquid level control time period is shorter than the time period from the time at which the liquid level LL exceeds the lower limit level L2 to the time at which the liquid level LL reaches the upper limit level L1. The CPU 41 stores the liquid level control time period specified by the processing at S47, in the flash memory 44 (S48).

As described above, in the state in which the liquid level LL is at the upper limit level L1, there is a possibility that the atomizing performance of the transducer 75 may have deteriorated. Thus, in order to cause the liquid level LL to fall lower than the upper limit level L1, the CPU 41 discharges the liquid from the container 71 to the discharge tank 91 via the discharge tube 92. The CPU 41 starts driving of the discharge pump 93 illustrated in FIG. 4 (S51). In this way, the discharge of the liquid from the container 71 illustrated in FIG. 4 to the discharge tank 91 via the discharge tube 92 is started, and the liquid level LL falls from upper limit level L1.

Based on the lower limit signal from the level sensor 78 illustrated in FIG. 4, the CPU 41 determines whether the liquid level LL illustrated in FIG. 4 has reached the lower limit level L2 (S52). When the CPU 41 is not receiving the lower limit signal from the level sensor 78, the CPU 41 determines that the liquid level LL is higher than the lower limit level L2 (no at S52). In this case, the CPU 41 repeats the determination at S52 until the liquid level LL reaches the lower limit level L2.

When the CPU 41 receives the lower limit signal from the level sensor 78, the CPU 41 determines that the liquid level LL has reached the lower limit level L2 (yes at S52). In this case, the CPU 41 drives the discharge pump 93 illustrated in FIG. 4 by a predetermined amount from the time at which the liquid level LL reaches the lower limit level L2 (S53). In the present embodiment, "the time at which the liquid level LL reaches the lower limit level L2" refers to a time at which the level sensor 78 switches from the state of not outputting the lower limit signal to the state of outputting the lower limit signal.

When the CPU 41 has driven the discharge pump 93 by the predetermined amount, the CPU 41 stops the driving of the discharge pump 93. For example, the CPU 41 may stop the driving of the discharge pump 93 when an integrated number of a number of revolutions of the discharge pump 93 has reached a predetermined number from the time at which the liquid level LL reaches the lower limit level L2. For example, the CPU 41 may stop the driving of the discharge pump 93 when an elapsed time period from the time at which the liquid level LL reaches the lower limit level L2 has reached a predetermined time period.

The predetermined number or the predetermined time period is stored in the ROM 42 or the flash memory 44. The predetermined number or the predetermined time period is set to a number of revolutions or a length of a time period equivalent to the discharge pump 93 being driven in the state of the liquid level LL at the lower limit level L2 until the discharge of the liquid from the container 71 to the discharge tank 91 via the discharge tube 92 becomes difficult or impossible. In the present embodiment, the predetermined number or the predetermined time period is set to the number of revolutions or the length of the time period equivalent to the discharge pump 93 being driven in the state of the liquid level LL at the lower limit level L2 until the container 71 is empty. Thus, by the processing at S53, as illustrated by a state A13 (refer to FIG. 10), the container 71 becomes empty. In this way, in the container 71, when contamination or the like is attached to the inner walls at or below the upper limit level L1, that contamination is removed.

The CPU 41 switches the supply valve 83 illustrated in FIG. 4 from the closed state to the open state (S61). In this way, the supply of the liquid to the container 71 via the supply tube 82 from the supply tank 81 illustrated in FIG. 4 is started, and the liquid level LL rises.

Based on the lower limit signal from the level sensor 78 illustrated in FIG. 4, the CPU 41 determines whether the liquid level LL illustrated in FIG. 4 is equal to or lower than the lower limit level L2 (S62). When the CPU 41 is receiving the lower limit signal from the level sensor 78, the CPU 41 determines that the liquid level LL is still equal to or lower than the lower limit level L2 (yes at S62). In this case, the CPU 41 repeats the determination at S62 until the liquid level LL exceeds the lower limit level L2.

When the CPU 41 no longer receives the lower limit signal from the level sensor 78, the CPU 41 determines that the liquid level LL has become higher than the lower limit level L2 (no at S62). In this case, the CPU 41 starts the clock (S63). Based on a time period while measuring the time, the CPU 41 determines whether an elapsed time period from the time at which the liquid level LL exceeds the lower limit level L2 has reached the liquid level control time period stored in the flash memory 44 by the processing at S48 (S64). When the elapsed time period has not reached the liquid level control time period (no at S64), the CPU 41 repeats the determination at S64 until the elapsed time period reaches the liquid level control time period.

When the elapsed time period has reached the liquid level control time period (yes at S64), the CPU 41 switches the supply valve 83 illustrated in FIG. 4 from the open state to the closed state (S65). The CPU 41 returns the processing to the supply control processing illustrated in FIG. 8. By the processing at S65, the supply of the liquid to the container 71 via the supply tube 82 from the supply tank 81 illustrated in FIG. 4 is stopped, and as illustrated by a state A14 (refer to FIG. 10), the liquid level LL is maintained at a level between the upper limit level L1 and the lower limit level L2.

As described above, in the present embodiment, the liquid level control time period is of the length obtained by multiplying the time period from the time at which the liquid level LL exceeds the lower limit level L2 to the time at which the liquid level LL reaches the upper limit level L1 by 0.5. Thus, at the time at which the elapsed time from when the liquid level LL exceeds the lower limit level L2 reaches the liquid level control time period, that is, at the time of the processing at S65, as illustrated by the state A14 (refer to FIG. 10), the liquid level LL is at approximately a midway level between the upper limit level L1 and the lower limit level L2.

Note that, in the present embodiment, "the liquid level LL is maintained at a level between the upper limit level L1 and the lower limit level L2" is not limited to a state in which fluctuations in the liquid level LL completely stop, in the state of the liquid level LL being between the upper limit level L1 and the liquid level LL as a result of completely stopping the supplying of the liquid to the container 71 and the discharge of the liquid from the container 71. "The liquid level LL is maintained at a level between the upper limit level L1 and the lower limit level L2" may also include, in a degree of fluctuations in the state of the liquid level LL between the upper limit level L1 and the lower limit level L2, a state in which one or both of the supply of the liquid to the container 71 or the discharge of the liquid from the container 71 are performed, for example.

The replacement processing will be described with reference to FIG. 11 and FIG. 12. The replacement processing includes processing equivalent to the processing from S41 to S65 of the initial introduction processing. Hereinafter, the same reference signs will be assigned to the processing, of each of the processing of the replacement processing, that is equivalent to the initial introduction processing, and a description thereof will be simplified or omitted. At a start time of the replacement processing, the liquid level LL is higher than the lower limit level L2, for example, as illustrated by a state A21 (refer to FIG. 12).

Figure 11:
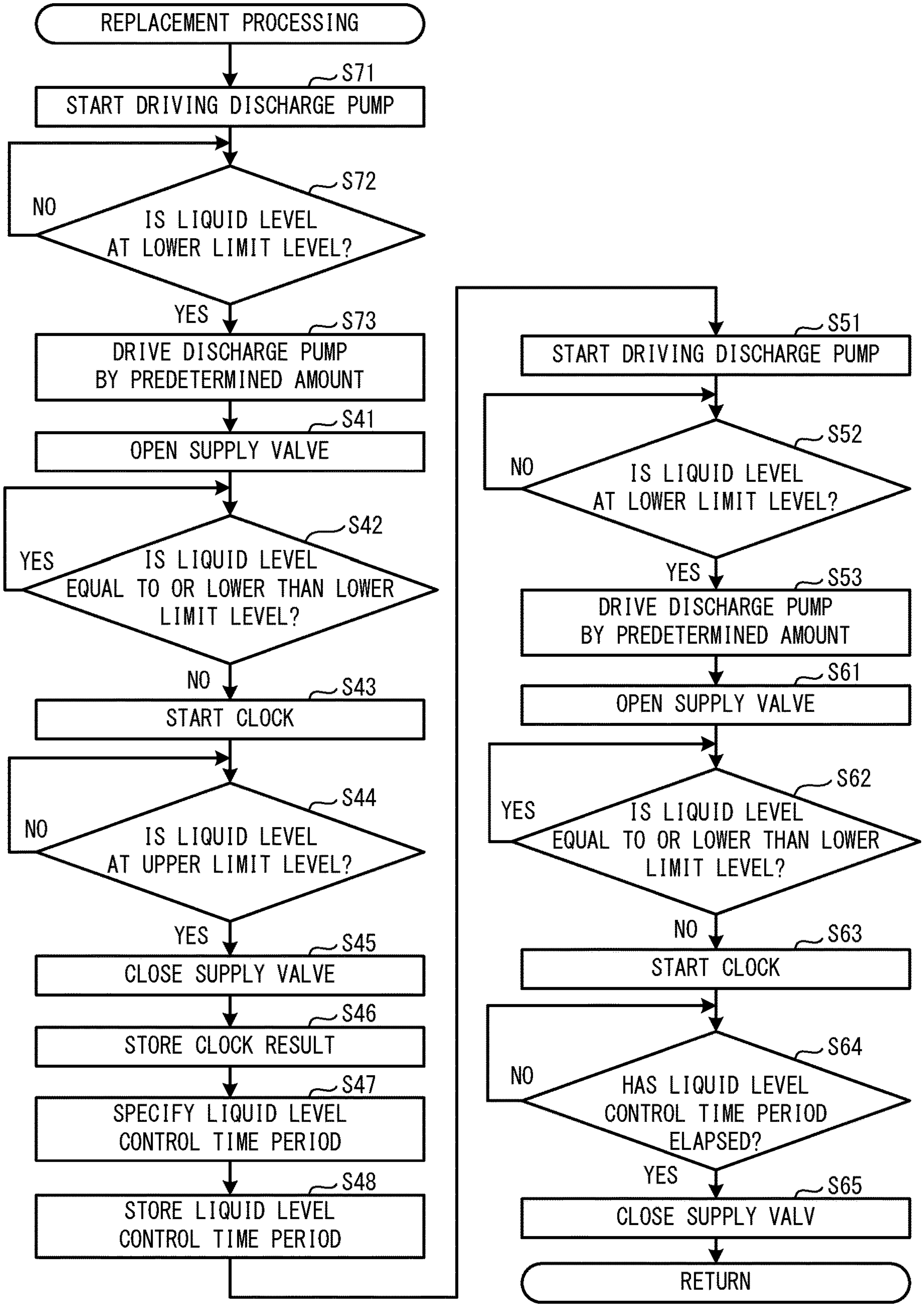
FIG. 11 is a flowchart of replacement processing.

As illustrated in FIG. 11, when the replacement processing is started, the CPU 41 starts the driving of the discharge pump 93 illustrated in FIG. 4 (S71). In this way, the discharge of the liquid to the discharge tank 91 via the discharge tube 92 from the container 71 illustrated in FIG. 4 is started, and the liquid level LL falls from the level higher than the lower limit level L2.

Based on the lower limit signal from the level sensor 78 illustrated in FIG. 4, the CPU 41 determines whether the liquid level LL illustrated in FIG. 4 has reached the lower limit level L2 (S72). When the CPU 41 is not receiving the lower limit signal from the level sensor 78, the CPU 41 determines that the liquid level LL is still higher than the lower limit level L2 (no at S72). In this case, the CPU 41 repeats the determination at S72 until the liquid level LL reaches the lower limit level L2.

When the CPU 41 receives the lower limit signal from the level sensor 78, the CPU 41 determines that the liquid level LL has reached the lower limit level L2 (yes at S72). In this case, the CPU 41 drives the discharge pump 93 illustrated in FIG. 4 by a predetermined amount from the time at which the liquid level LL reaches the lower limit level L2 (S73). The CPU 41 performs the processing at S73 in the same manner as the processing at S53. By the processing at S73, the container 71 becomes empty, as illustrated by a state A22 (refer to FIG. 12).

Figure 8:
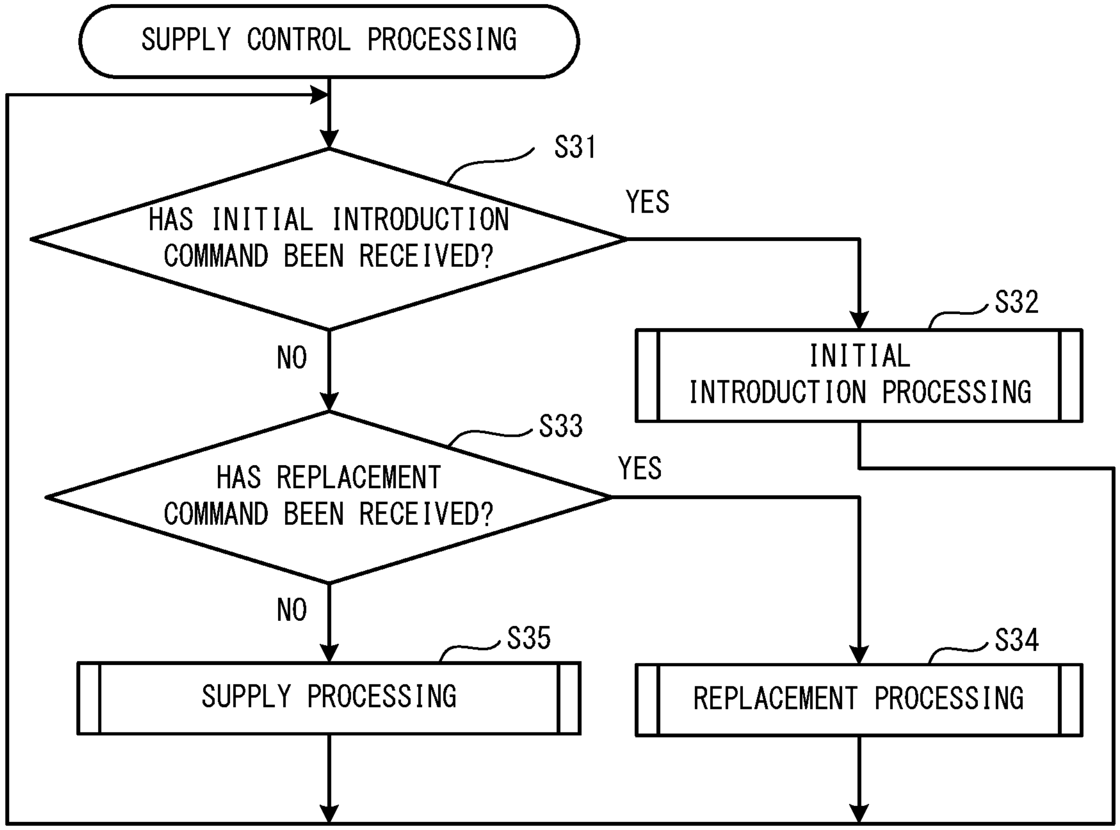
FIG. 8 is a flowchart of supply control processing.

The CPU 41 performs the processing from S41 to S65, and returns the processing to the supply control processing illustrated in FIG. 8. By the processing at S45, the supply of the liquid to the container 71 via the supply tube 82 from the supply tank 81 is stopped, and the liquid level LL is maintained at the upper limit level L1 as illustrated by a state A23 (refer to FIG. 12). In the replacement processing also, in a similar manner to the initial introduction processing, the CPU 41 specifies the liquid level control time period (S47), and stores the specified liquid level control time period in the flash memory 44 (S48).

Figure 12:
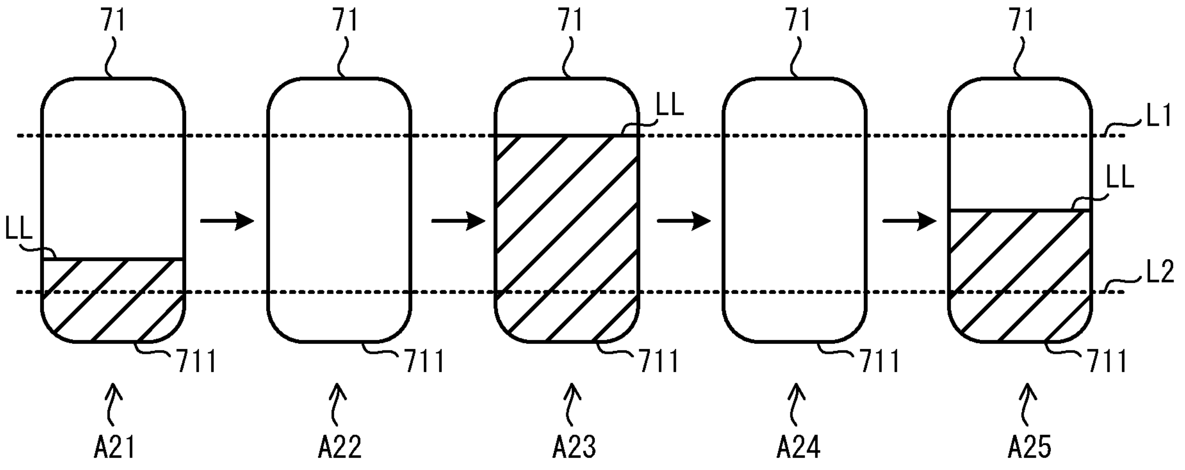
FIG. 12 is a state transition chart of a liquid level when the replacement processing is executed.

By the processing at S53, the container 71 becomes empty, as illustrated by a state A24 (refer to FIG. 12). In this way, in the container 71, when contamination or the like is attached to the inner walls at or below the upper limit level L1, that contamination is removed. In the replacement processing also, in a similar manner to the initial introduction processing, based on the liquid level control time period stored in the RAM 43 by the processing at S48, the CPU 41 switches the supply valve 83 illustrated in FIG. 4 from the open state to the closed state (S65). By the processing at S65, the supply of the liquid to the container 71 via the supply tube 82 from the supply tank 81 illustrated in FIG. 4 is stopped, and, as illustrated by a state A25 (refer to FIG.

12), the liquid level LL is maintained at a level between the upper limit level L1 and the lower limit level L2.

Figure 13:
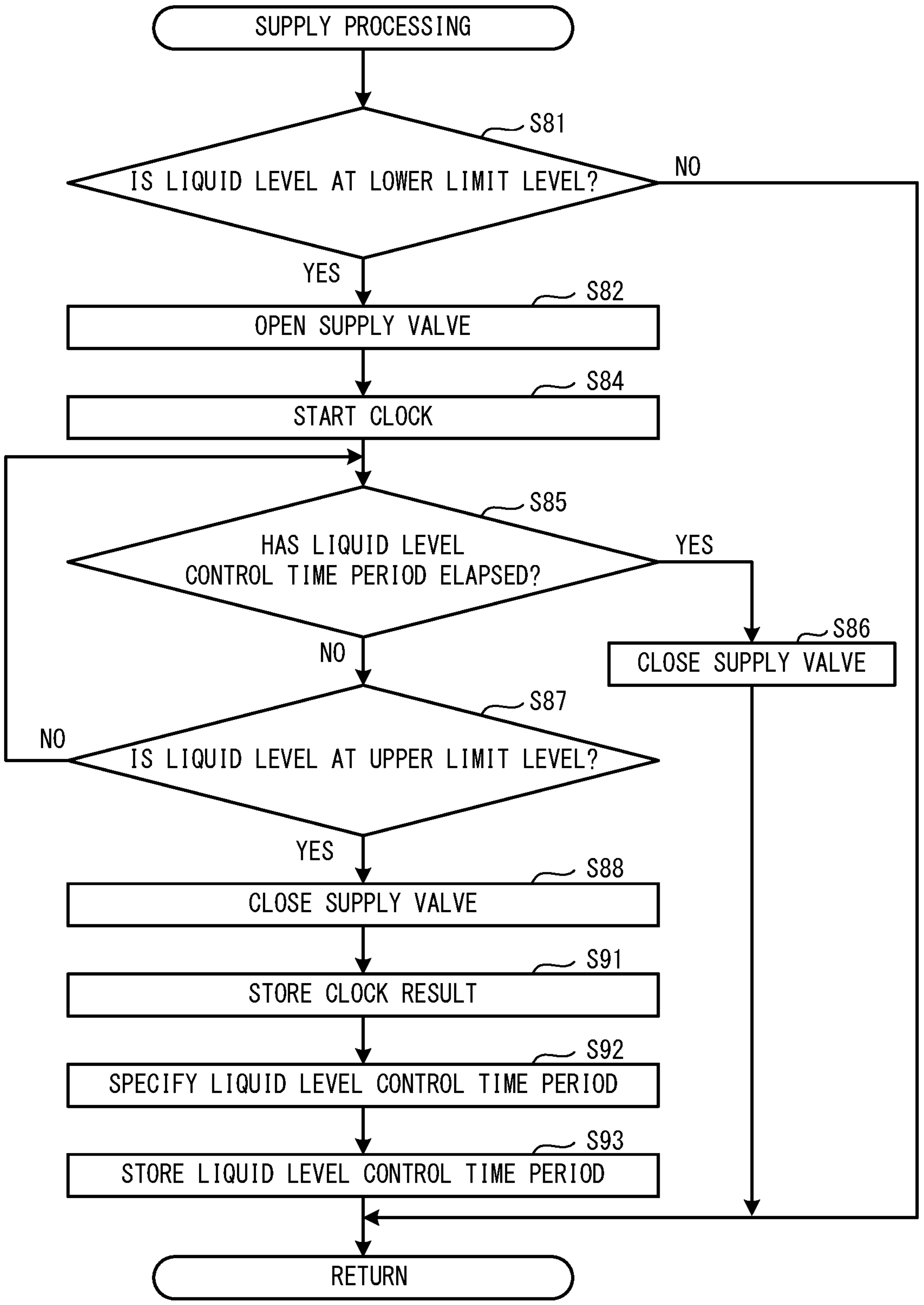
FIG. 13 is a flowchart of supply processing.
Figure 14:
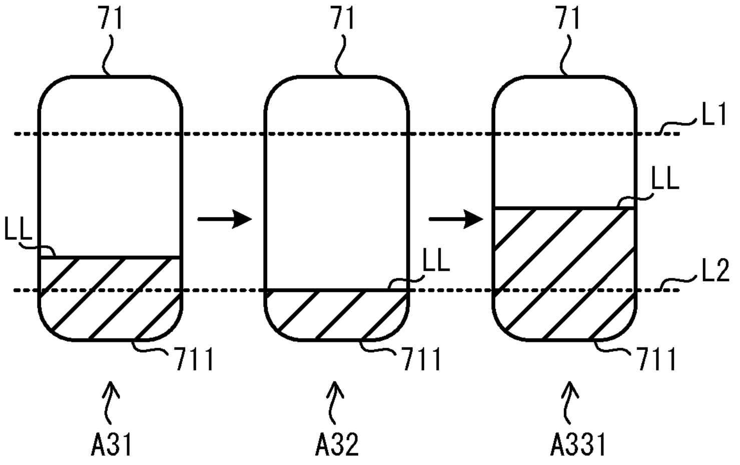
FIG. 14 is a state transition chart of a liquid level when the supply processing is executed.
Figure 15:
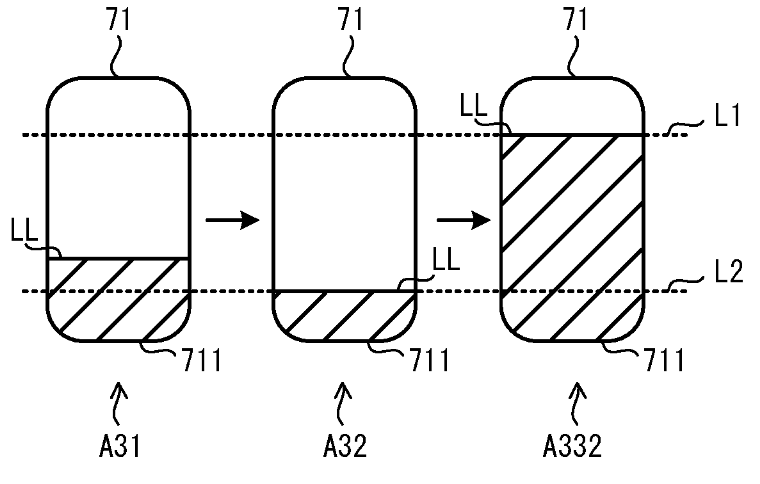
FIG. 15 is a state transition chart of a liquid level when the supply processing is executed.

The supply processing will be described with reference to FIG. 13 to FIG. 15. As illustrated in FIG. 13, based on the lower limit signal from the level sensor 78 illustrated in FIG. 4, the CPU 41 determines whether the liquid level LL illustrated in FIG. 4 has reached the lower limit level L2 (S81). When the CPU 41 is not receiving the lower limit signal from the level sensor 78, the CPU 41 determines that the liquid level LL is still higher than the lower limit level L2 (no at S81). In this case, the CPU 41 returns the processing to the supply control processing illustrated in FIG. 8.

As a result of the humidification control started by the processing at S12 being performed, the liquid level LL illustrated in FIG. 4 falls from the level higher than the lower limit level L2. In this way, the state of the liquid level LL higher than the lower limit level L2, as illustrated by a state A31 (refer to FIG. 14 and FIG. 15), becomes a state in which the liquid level LL has reached the lower limit level L2, as illustrated by a state A32 (refer to FIG. 14 and FIG. 15).

When the CPU 41 receives the lower limit signal from the level sensor 78, the CPU 41 determines that the liquid level LL has reached the lower limit level L2 (yes at S81). In this case, the CPU 41 switches the supply valve 83 illustrated in FIG. 4 from the closed state to the open state (S82). In this way, the supply of the liquid to the container 71 via the supply tube 82 from the supply tank 81 illustrated in FIG. 4 is started, and the liquid level LL rises.

The CPU 41 starts the clock (S84). Based on a time period while measuring the time, the CPU 41 determines whether an elapsed time period from the time at which the supply valve 83 illustrated in FIG. 4 is switched to the open state (the time at which the liquid level LL exceeds the lower limit level L2) has reached the liquid level control time period (S85). When a plurality of the liquid level control time periods are stored in the flash memory 44, in the processing at S85, the CPU 41 refers to the most recent liquid level control time period, of the plurality of liquid level control time periods stored in the flash memory 44 by the processing at S48 of the initial introduction processing (refer to FIG. 9), by the processing at S48 of the replacement processing (refer to FIG. 11), or by processing at S93 to be described later. When storing the liquid level control time period in the flash memory 44, the CPU 41 may delete the already stored liquid level control time period.

When the elapsed time period has not reached the liquid level control time period (no at S85), based on the upper limit signal from the level sensor 78 illustrated in FIG. 4, the CPU 41 determines whether the liquid level LL illustrated in FIG. 4 has reached the upper limit level L1 (S87). When the CPU 41 is not receiving the upper limit signal from the level sensor 78, the CPU 41 determines that the liquid level LL is lower than the upper limit level L1 (no at S87). In this case, the CPU 41 returns the processing to the determination at S85.

When the elapsed time period reaches the liquid level control time period before the liquid level LL reaches the upper limit level L1 (yes at S85), the CPU 41 switches the supply valve 83 illustrated in FIG. 4 from the open state to the closed state (S86). The CPU 41 returns the processing to the supply control processing illustrated in FIG. 8. By the processing at S86, the supply of the liquid to the container 71 via the supply tube 82 from the supply tank 81 illustrated in FIG. 4 is stopped, and, as illustrated by a state A331 (refer to FIG. 14), the liquid level LL is maintained at a level between the upper limit level L1 and the lower limit level L2.

For example, from the time at which the liquid level control time period is stored in the flash memory 44 by the processing at S48 of the initial introduction processing (refer to FIG. 9), the processing at S48 of the replacement processing (refer to FIG. 11), or the processing at S93 to be described later, the configuration may be changed in the following ways. For example, by raising the height of the base 80 illustrated in FIG. 4, the water head difference between the liquid in the supply tank 81 and the liquid in the container 71 may be increased. The inner diameter of the supply tube 82 illustrated in FIG. 4 may be increased. In place of the supply tank 81, the container 71 illustrated in FIG. 4 may be connected to a public water supply (not illustrated) via the supply tube 82. In these cases, a flow rate of the liquid flowing toward the container 71 via the supply tube 82 from the supply tank 81 increases. Thus, the liquid level LL may reach the upper limit level L1 before the elapsed time reaches the liquid level control time period.

When the liquid level LL reaches the upper limit level L1 before the elapsed time reaches the liquid level control time period (yes at S87), the CPU 41 switches the supply valve 83 illustrated in FIG. 4 from the open state to the closed state (S88). By the processing at S88, the supply of the liquid to the container 71 via the supply tube 82 from the supply tank 81 illustrated in FIG. 4 is stopped, and, as illustrated by a state A332 (refer to FIG. 15), the liquid level LL is maintained at the upper limit level L1. In this case, for example, the CPU 41 does not drive the discharge pump 93 illustrated in FIG. 4, that is, does not cause the liquid level LL illustrated in FIG. 4 to fall from the upper limit level L1. When the processing at S88 is performed during the execution of the humidification control started by the processing at S12, the CPU 41 continuously performs the humidification control in the state in which the liquid level LL is at the upper limit level L1.

The CPU 41 stores the result of the clock started by the processing at S84 in the RAM 43 (S91). In a similar manner to the processing at S47, the CPU 41 specifies the liquid level control time period, based on the clock result (S92). The CPU 41 stores the liquid level control time period specified by the processing at S92 in the flash memory 44 (S93). In this way, the liquid level control time period corresponding to the state in which the configuration is changed such that the flow rate of the liquid flowing toward the container 71 via the supply tube 82 from the supply tank 81 illustrated in FIG. 4 increases is stored in the flash memory 44. The CPU 41 returns the processing to the supply control processing illustrated in FIG. 8.

Main effects of the above-described embodiment will be described. Hereinafter, a level at which the liquid level LL is lower than the upper limit level L1 and higher than the bottom surface 711 will be referred to as a "maintained position." In the above-described embodiment, the maintained position is a level at which the liquid level LL is lower than the upper limit level L1 and higher than the lower limit level L2.

The printer 1 is provided with the container 71, the transducer 75, the supply valve 83, the first reed switch 785, and the CPU 41. The container 71 includes the bottom surface 711. The liquid is stored in the container 71. The transducer 75 humidifies the air by vibrating the liquid stored in the container 71. The supply valve 83 causes the liquid level LL stored in the container 71 to rise. The first reed switch 785 outputs the upper limit signal indicating that the liquid level LL has reached the upper limit level L1. The CPU 41 controls the supply valve 83 and changes the liquid level LL (S82). After the processing at S82, the CPU 41 controls the supply valve 83 and maintains the liquid level LL at the maintained position (S86).

According to the above, in the processing at S86, the CPU 41 maintains the liquid level LL at the maintained position. The maintained position is lower than the upper limit level L1, and thus, after performing the processing at S86, the liquid level LL becomes lower than the upper limit level L1. Thus, compared to when the liquid level LL is at the upper limit level L1 after the processing at S86, the CPU 41 contributes to an advantage of suppressing a state of deterioration in the atomizing performance of the transducer 75. Note that, in the same way, at S61 and S65 of the initial introduction processing, and S61 and S65 of the replacement processing also, compared to when the liquid level LL is at the upper limit level L1 after the processing at S65 of the initial introduction processing and the replacement processing, the CPU 41 contributes to the advantage of suppressing the state of deterioration in the atomizing performance of the transducer 75

The printer 1 is provided with the second reed switch 786. The second reed switch 786 outputs the lower limit signal indicating that the liquid level LL has reached the lower limit level L2. The lower limit level L2 is lower than the upper limit level L1. In the humidification control, the CPU 41 humidifies the air by vibrating the transducer 75 (S12). When the lower limit signal is output by the second reed switch 786 during the execution of the processing at S12 (during the execution of the humidification control), the CPU 41 controls the supply valve 83 and causes the liquid level LL to rise (S82). The CPU 41 controls the supply valve 83 on the basis of the liquid level control time period, and maintains the liquid level LL at the maintained position (S86). The liquid level control time period is the parameter for maintaining the liquid level LL at the maintained position, and is stored in the flash memory 44.

According to the above, in the processing at S86, the CPU 41 controls the supply valve 83 on the basis of the liquid level control time period. Thus, in the processing at S86, the CPU 41 contributes to an advantage of causing the liquid level LL to be easily maintained at the maintained position.

After the processing at S82 is performed, when the upper limit signal is output by the first reed switch 785 before the supply valve 83 is controlled on the basis of the liquid level control time period by the processing at S86 and the liquid level LL is maintained at the maintained position, the CPU 41 controls the supply valve 83 and maintains the liquid level LL at the upper limit level L1 (S88). When the processing at S88 has been performed during the execution of the processing at S12 (during the execution of the humidification control), the CPU 41 continues the processing at S12 (the humidification control).

According to the above, even if the processing at S88 is performed during the execution of the processing at S12 (during the execution of the humidification control), the CPU 41 continues the processing at S12. In other words, even if the liquid level LL reaches the upper limit level L1 during the execution of the humidification control, the humidification control is not stopped. Thus, the CPU 41 contributes to an advantage of shortening a time required for performing the humidification in order for the actual humidity to reach the target humidity, even when the processing at S88 is performed during the execution of the processing at S12.

After the processing at S82 is performed, when the upper limit signal is output by the first reed switch 785 before the supply valve 83 is controlled on the basis of the liquid level control time period by the processing at S86 and the liquid level LL is maintained at the maintained position, the CPU 41 controls the supply valve 83 and maintains the liquid level LL at the upper limit level L1 (S88). Based on the fact that the upper limit signal has been output by the first reed switch 785, the CPU 41 stores the liquid level control time period in the flash memory 44 (S93).

According to the above, the CPU 41 stores the liquid level control time period on the basis of an actual detection result by the first reed switch 785. Thus, the CPU 41 contributes to an advantage of suppressing the liquid level LL from becoming displaced from the target maintained position in the processing at S86.

Furthermore, the configuration of the supply flow path of the liquid to the container 71 may be changed from the time at which the liquid level control time period is stored in the flash memory 44 by the processing at S48 of the initial introduction processing, the processing at S48 in the replacement processing, or the processing at S93. For example, in place of the supply tank 81, the supply tube 82 may be connected to the public water supply. In this case, for example, the flow rate of the liquid flowing toward the container 71 via the supply tube 82 from the supply tank 81 increases to a degree at which the upper limit signal is output by the first reed switch 785 before the supply valve 83 is controlled based on the liquid level control time period by the processing at S86 and the liquid level LL is maintained at the maintained position. Even when the configuration is changed in such a way, in the processing at S88 from a next time onward, the CPU 41 controls the supply valve 83 based on the liquid level control time period stored after the change in the configuration. Thus, the CPU 41 contributes to the advantage of suppressing the liquid level LL from becoming displaced from the target maintained position in the processing at S86, even when the configuration of the supply flow path of the liquid to the container 71 is changed.

The CPU 41 receives the initial introduction command (yes at S31). When the CPU 41 receives the initial introduction command, the CPU 41 controls the supply valve 83 and causes the liquid level LL to rise (S41 of the initial introduction processing). Based on the fact that the upper limit signal is output from the first reed switch 785, the CPU 41 stores the liquid level control time period in the flash memory 44 (S48 of the initial introduction processing).

According to the above, the CPU 41 stores the liquid level control time period based on the actual detection result by the first reed switch 785. Thus, the CPU 41 contributes to the advantage of suppressing the liquid level LL from becoming displaced from the target maintained position in the processing at S65 and S86.

The printer 1 is provided with the discharge pump 93. The discharge pump 93 causes the liquid level LL to fall. The CPU 41 receives the replacement command (yes at S33). When the CPU 41 receives the replacement command, the CPU 41 controls the discharge pump 93 and causes the liquid level LL to fall (S71). Subsequently, based on the fact that the lower limit signal is output by the second reed switch 786, the CPU 41 controls the supply valve 83 and causes the liquid level LL to rise (S41). Based on the fact that the upper limit signal is output by the first reed switch 785, the CPU 41 stores the liquid level control time period in the flash memory 44 (S48).

According to the above, the CPU 41 stores the liquid level control time period using the actual detection result by the first reed switch 785. Thus, the CPU 41 contributes to the advantage of suppressing the liquid level LL from becoming displaced from the target maintained position in the processing at S65 and S86.

The CPU 41 controls the supply valve 83 and causes the liquid level LL to rise (S41). Subsequent to that, when the upper limit signal is output by the first reed switch 785, the CPU 41 controls the discharge pump 93 and causes the liquid level LL to fall (S51). Subsequent to that, the CPU 41 controls the supply valve 83 and causes the liquid level LL to rise (S61). The CPU 41 controls the supply valve 83 based on the liquid level control time period and maintains the liquid level LL at the maintained position (S65).

In this case, the CPU 41 controls the supply valve 83 based on the liquid level control time period in the processing at S65 after the processing at S51 has been performed. Thus, the CPU 41 contributes to the advantage of suppressing the liquid level LL from becoming displaced from the target maintained position in the processing at S65.

The CPU 41 controls the supply valve 83, and causes the liquid level LL to rise (S41). Subsequently, the CPU 41 specifies the liquid level control time period based on the fact that the upper limit signal is output by the first reed switch 785 (S47). The CPU 41 stores the specified liquid level control time period in the flash memory 44 (S48).

According to the above, in specification processing, the CPU 41 specifies the liquid level control time period based on the fact that the upper limit signal is output by the first reed switch 785. Thus, the printer 1 does not need to be provided with a sensor for specifying the liquid level control time period separately from the first reed switch 785. Thus, the CPU 41 contributes to the advantage of suppressing the state of deterioration in the atomizing performance of the transducer 75, while suppressing a number of components of the printer 1 from increasing.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. The CPU 41 may omit the determination at S22. In other words, when the CPU 41 receives the print command by the processing at S21, the printing by the printer 1 may be performed by the processing at S23 regardless of the humidity in the maintenance space S2 and the humidity in the stand-by space S3.

The print enable condition is not limited to that of the above-described embodiment. For example, in the determination at S22, the CPU 41 may determine whether the print enable condition is satisfied based on the detection signal from only one of the humidity sensors 36 or 37. In the determination at S22, the CPU 41 may determine whether the print enable condition is satisfied when the elapsed time from when the humidification control is started by the processing at S12 reaches a predetermined time period.

The humidification control is not limited to that of the above-described embodiment. For example, in the humidification control, the CPU 41 may intermittently perform the humidification operation, without being based on the detection signals from the humidity sensors 36 and 37. For example, the reference humidities may be stored in the ROM 42 or the flash memory 44 for each of temperatures. In this case, in the humidification control, in addition to the humidity in the maintenance space S2 and the humidity in the stand-by space S3, the CPU 41 may control the humidification operation on the basis of a temperature of the atmosphere in the maintenance space S2 and a temperature of the atmosphere in the stand-by space S3. In a similar manner, the reference humidity ranges may be stored in the ROM 42 or the flash memory 44 for each of temperatures. In addition to the humidity in the maintenance space S2 and the humidity in the stand-by space S3, the CPU 41 may determine whether the print enable condition is satisfied on the basis of the temperature of the atmosphere in the maintenance space S2 and the temperature of the atmosphere in the stand-by space S3. In this case, a temperature sensor may be provided in the maintenance space S2 and the stand-by space S3, or may be provided in the printing space S1.

Positions at which the humidity sensors 36 and 37 are provided are not limited to those of the above-described embodiment. The humidity sensor 36 is preferably provided in the vicinity of the other end 7312 of the tube 731. The humidity sensor 37 is preferably provided in the vicinity of the other end 7322 of the tube 732. In place of, or in addition to the humidity sensors 36 and 37, a humidity sensor may be provided in the printing space S1. In this case, the humidity sensor detects the humidity in the printing space S1. The CPU 41 may perform the humidification control on the basis of the humidity in the printing space S1. The CPU 41 may determine that the print enable condition is satisfied on the basis of the humidity in the printing space S1.

In the above-described embodiment, the fans 76 and 77 are respectively provided in the tubes 731 and 732 in the humidifier 7. In contrast to this, the humidifier 7 may be provided with one fan. In this case, the air humidified in the container 71 by the rotation of the one fan may be respectively sent to the maintenance space S2 and the stand-by space S3 via the tubes 731 and 732, respectively. In place of, or in addition to the tubes 731 and 732, the humidifier 7 may be provided with a tube for sending the air humidified in the container 71 to the printing space S1. In place of, or in addition to the tubes 731 and 732, the humidifier 7 may be provided with a tube for sending the air humidified in the container 71 to a space through which the heads 3 do not pass.

In place of, or in addition to the level sensor 78, the printer 1 may be provided with a flowmeter. The flowmeter may be provided in one of the supply tube 82 or the discharge tube 92, or in both the supply tube 82 and the discharge tube 92. For example, the flowmeter of the supply tube 82 detects a supply amount of the liquid to the container 71 from the supply tank 81, and outputs a signal indicating the detected supply amount to the CPU 41. The flowmeter of the discharge tube 92 detects a discharge amount of the liquid from the container 71 to the discharge tank 91, and outputs a signal indicating the detected discharge amount to the CPU 41.

In this case, the ROM 42 may store, in advance, a liquid amount in the container 71 when the liquid level LL is at the height H1. In the processing at S65 and S86, a liquid level control supply amount is defined as a parameter for maintaining the liquid level LL at a level between the upper limit level L1 and the lower limit level L2. The liquid level control supply amount is greater than zero liters, and smaller than the liquid amount in the container 71 when the liquid level LL is at the height H1. When, in the determination at S85, the detected supply amount reaches the liquid level control supply amount, based on the signal from the flowmeter of the supply tube 82, the CPU 41 may switch the supply valve 83 from the open state to the closed state in the processing at S86.

Furthermore, the CPU 41 may store, in the flash memory 44, the supply amount of the liquid from the supply tank 81 to the container 71. The CPU 41 may store, in the flash memory 44, a discharge amount of the liquid from the container 71 to the discharge tank 91, based on a signal from the flowmeter of the discharge tube 92. The ROM 42 may store, in advance, a formula for calculating a reduction amount of the liquid in the container 71 based on a drive time of the transducer 75. Based on the formula, the CPU 41 may calculate the reduction amount of the liquid in the container 71 in accordance with a cumulative time period of the drive time of the transducer 75. The CPU 41 may identify a liquid amount in the container 71 based on the supply amount, the discharge amount, and the reduction amount. The liquid amount in the container 71 corresponds to the liquid level LL.

In place of or in addition to the level sensor 78, the printer 1 may be provided with a weight scale. The weight scale detects a weight of the liquid in the container 71, and outputs the detected weight to the CPU 41. The weight of the liquid in the container 71 corresponds to the liquid level LL. Thus, "the weight scale outputs a signal, to the CPU 41, indicating the weight of the liquid in the container 71" means that the weight scale outputs, to the CPU 41, a signal indicating the liquid level LL. The printer 1 is not limited to the level sensor 78 and the weight scale, and it is sufficient that the printer 1 be provided with a sensor that outputs a signal to the CPU 41 indicating the liquid level LL.

The configuration of the level sensor 78 is not limited to that of the above-described embodiment. For example, the level sensor 78 may be an optical sensor. The level sensor 78 need not necessarily be provided with the second reed switch 786. In other words, the level sensor 78 need not necessarily detect that the liquid level LL has fallen to be equal to or lower than the lower limit level L2. In this case, when the liquid level LL has risen, the CPU 41 may specify the liquid level control time period based on a time period from a state of the container 71 being empty to a time at which the liquid level LL reaches the upper limit level L1.

In the determination at S13 and S81, for example, the CPU 41 may determine whether a cumulative time of a drive time period of the transducer 75 from the execution of the processing at S65, S86, or S88 has exceeded a predetermined time period. For example, in the determination at S13, when the cumulative time of the drive time period of the transducer 75 from the execution of the processing at S65, S86, or S88 has exceeded the predetermined time period, the CPU 41 may stop the humidification control in the processing at S14.

The CPU 41 may omit the determination at S42 and S62. In other words, the CPU 41 may start the clock in the processing at S43 or S63, from the time at which the supply valve 83 is switched from the closed state to the open state by the processing at S41 or S61.

The CPU 41 may omit the determination at S52 and S72. In this case, the CPU 41 may stop the driving of the discharge pump 93 when, from a time at which the driving of the discharge pump 93 by the processing at S51 or S71 is started, an elapsed time reaches a predetermined time period, or when a cumulative number of a number of revolutions of the discharge pump 93 reaches a predetermined number. The predetermined time period and the predetermined number are preferably is set to an extent at which, from the discharge pump 93 being driven with the liquid level LL at the upper limit level L1, the liquid level LL reaches a liquid level at which the discharge of the liquid from the container 71 to the discharge tank 91 becomes difficult or impossible.

In place of, or in addition to the supply valve 83, a discharge pump may be provided in the supply tube 82. As a result of being driven, the discharge pump supplies the liquid to the container 71 via the supply tube 82 from the supply tank 81. As a result of being stopped, the supply pump stops the liquid from being supplied to the container 71 via the supply tube 82 from the supply tank 81. In this case, in order to supply the liquid to the container 71 via the supply tube 82 from the supply tank 81, the printer 1 may use the water head difference between the liquid in the supply tank 81 and the liquid in the container 71, or need not necessarily use the water head difference.

When the supply pump is provided in the supply tube 82, the CPU 41 may start counting the number of revolutions of the supply pump in the processing at S43, S63, and S84. The CPU 41 may store the cumulative number of the number of revolutions of the supply pump in the RAM 43 in the processing at S46 and S91. The CPU 41 may specify a liquid level control number of revolutions, based on the counted cumulative number of the number of revolutions of the supply pump, in the processing at S47 and S92. The liquid level control number of revolutions is a parameter for maintaining the liquid level LL at a level between the upper limit level L1 and the lower limit level L2 in the processing at S65 and S86. For example, the liquid level control number of revolutions is a cumulative number of the number of revolutions of the supply pump from a time at which the liquid level LL exceeds the lower limit level L2 to a time at which the liquid level LL reaches the upper limit level L1.

In the processing at S48 and S93, the CPU 41 may store the specified liquid level control number of revolutions in the flash memory 44. In the determination at S64 and S85, the CPU 41 may determine whether the counted cumulative number of the number of revolutions of the supply pump has reached the liquid level control number of revolutions. In the processing at S64 or S85, when the counted cumulative number of the number of revolutions of the supply pump has reached the liquid level control number of revolutions, the CPU 41 may switch the supply valve 83 from the open state to the closed state in the processing at S65 or S86.

In place of, or in addition to the discharge pump 93, a discharge valve may be provided in the discharge tube 92. The discharge valve is switched between an open state and a closed state by a solenoid, for example. In the open state, the discharge valve allows the liquid to flow in the discharge tube 92 via the supply valve. In the closed state, the discharge valve blocks the liquid from flowing in the discharge tube 92 via the supply valve. In this case, in order to discharge the liquid to the discharge tank 91 via the discharge tube 92 from the container 71, the printer 1 may use a water head difference between the liquid in the discharge tank 91 and the liquid in the container 71.

In the above-described embodiment, between the processing at S82 and the processing at S84, in a similar manner to the determination at S42, the CPU 41 may determine whether the liquid level LL is equal to or lower than the lower limit level L2, based on the lower limit signal from the level sensor 78.

In the present embodiment, when the liquid level LL rises, the CPU 41 specifies the liquid level control time period based on the time period from the time at which the liquid level LL exceeds the lower limit level L2 to when the liquid level LL reaches the upper limit level L1. In contrast to this, when the liquid level LL rises, the CPU 41 may specify the liquid level control time period based on a time period from when the container 71 is empty to a time at which the liquid level LL reaches the upper limit level L1, the height H1, and the height H2. When the liquid level LL rises, the CPU 41 may specify the liquid level control time period based on a time period from when the container 71 is empty to a time at which the liquid level LL exceeds the lower limit level L2, the height H1, and the height H2.

Furthermore, when liquid level LL falls as a result of the driving of the discharge pump 93 in the state in which the humidification control is stopped, the CPU 41 may specify the liquid level control time period based on a time period from a time at which the liquid level LL falls lower than the upper limit level L1 to a time at which the liquid level LL reaches the lower limit level L2. For example, the CPU 41 may correct the liquid level control time period based on the flow rate of the liquid flowing to the discharge tank 91 via the discharge tube 92 from the container 71 due to the driving of the discharge pump 93, and on the flow rate of the liquid to the container 71 via the supply tube 82 from the supply tank 81 when the supply valve 83 is in the open state. Note that "the time at which the liquid level LL falls lower than the upper limit level L1" refers to a time at which the level sensor 78 switches from the state of outputting the upper limit signal to the state of not outputting the upper limit signal.

Figure 16:
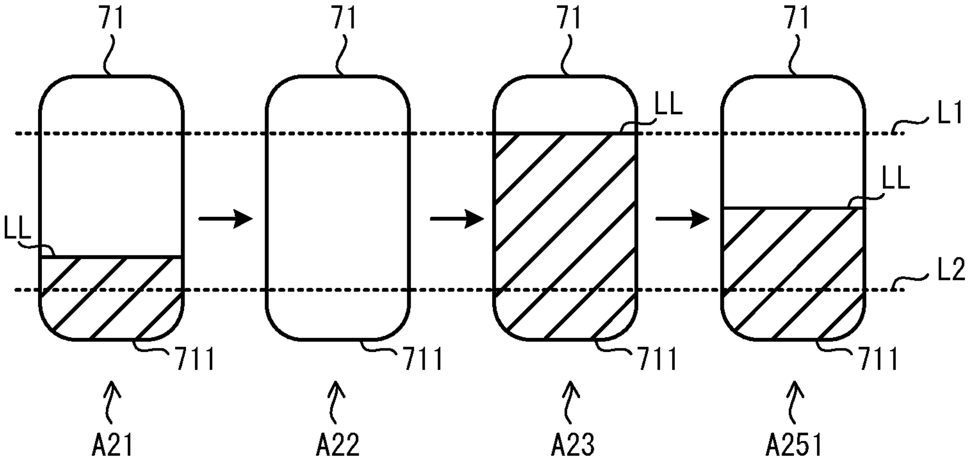
FIG. 16 is a state transition chart of a liquid level when the replacement processing is executed.

The replacement processing (S34) according to a first modified example will be described with reference to FIG. 16. In the replacement processing according to the first modified example, the CPU 41 omits the processing at S52 to S62 illustrated in FIG. 11. In other words, after starting the driving of the discharge pump 93 by the processing at S51, the CPU 41 starts the clock by the processing at S63. When the elapsed time from the clock started by the processing at S63 reaches the liquid level control time period (yes at S64), in place of the processing at S65, the CPU 41 stops the driving of the discharge pump 93. In this way, as illustrated in FIG. 16, the liquid level LL changes from the state A23 to a state A251. As illustrated by the state A251, the discharge of the liquid to the discharge tank 91 via the discharge tube 92 from the container 71 is stopped, and the liquid level LL is maintained at a level between the upper limit level L1 and the lower limit level L2. According to this configuration, the CPU 41 contributes to an advantage that the discharge amount of the liquid from the container 71 decreases.

Note that, in the initial introduction processing also, in a similar manner, the CPU 41 may omit the processing at S52 to S62 illustrated in FIG. 9. In the supply processing, when the liquid level LL reaches the lower limit level L2 (yes at S81), the CPU 41 may perform the replacement processing of the above-described embodiment, or may perform the replacement processing according to the first modified example.

In the replacement processing according to the first modified example, the CPU 41 may refer to the corrected liquid level control time period. For example, the CPU 41 may correct the liquid level control time period based on the flow rate of the liquid flowing to the discharge tank 91 via the discharge tube 92 from the container 71 by the driving of the discharge pump 93, and the flow rate of the liquid to the container 71 via the supply tube 82 from the supply tank 81 when the supply valve 83 is in the open state. When the liquid level LL falls as a result of the driving of the discharge pump 93 in the state in which the humidification control is stopped, the CPU 41 may refer to the liquid level control time period specified on the basis of the time period from the time at which the liquid level LL falls lower than the upper limit level L1 until the liquid level LL reaches the lower limit level L2.

Figure 17:
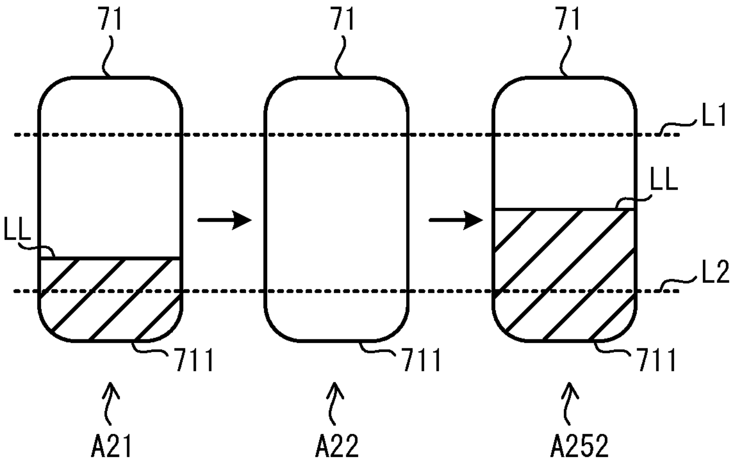
FIG. 17 is a state transition chart of a liquid level when the replacement processing is executed.

The replacement processing (S34) according to a second modified example will be described with reference to FIG. 17. In the replacement processing according to the second modified example, the CPU 41 omits the processing at S41 to S53 illustrated in FIG. 11. In other words, the CPU 41 starts the clock by the processing at S63 after the discharge pump 93 has been driven by the predetermined amount by the processing at S73. In this way, as illustrated in FIG. 17, the liquid level LL changes from the state A22 to a state A252. According to this configuration, the CPU 41 contributes to the advantage that the discharge amount of the liquid from the container 71 decreases.

Note that, in the initial introduction processing also, in a similar manner, the CPU 41 may omit the processing at S41 to S53 illustrated in FIG. 9. In this case, for example, the CPU 41 may specify the liquid level control time period on the basis of the time period from the processing at S61 to when the liquid level LL reaches the lower limit level L2. In the supply processing, when the liquid level LL reaches the lower limit level L2 (yes at S81), the CPU 41 may perform the replacement processing according to the second modified example.

In the above-described embodiment, the CPU 41 receives the replacement command when the user operates the operation buttons 15. In contrast to this, the CPU 41 may periodically receive the replacement command. For example, the CPU 41 may receive the replacement command in the determination at S33 when the power supply to the printer 1 is turned on in a state in which the power supply to the printer 1 has been off for a predetermined duration, and the supply control processing is performed. A length of the predetermined duration is not limited, and is two weeks, for example. The CPU 41 may receive the replacement command in the determination at S33 when a predetermined duration has elapsed from when the supply valve 83 was last in the open state.

Different replacement processing may be performed depending on the case in which the CPU 41 receives the replacement command via the operation buttons 15, the case in which the CPU 41 receives the replacement command when the power supply to the printer 1 is turned on in a state in which the power supply to the printer 1 has been off for a first predetermined duration, and the supply control processing is performed, and a case in which the CPU 41 receives the replacement command when a second predetermined duration has elapsed from when the supply valve 83 was last in the open state. Note that the second predetermined duration is shorter than the first predetermined duration. For example, the replacement processing of the above-described embodiment may be performed when the CPU 41 receives the replacement command via the operation buttons 15, and when the CPU 41 receives the replacement command when the power supply to the printer 1 is turned on in a state in which the power supply to the printer 1 has been off for the first predetermined duration and the supply control processing is performed. When the CPU 41 receives the replacement command when the second predetermined duration has elapsed from when the supply valve 83 was last in the open state, the CPU 41 may perform the replacement processing according to the first modified example.

In the initial introduction processing or the replacement processing, the CPU 41 may omit the processing at S51 to S65. In other words, in the initial introduction processing, the CPU 41 may end the initial introduction processing when the liquid level LL is in the state A12, and may return the processing to the supply control processing. In the replacement processing, the CPU 41 may end the replacement processing in the state A23, and may return the processing to the supply control processing.

The CPU 41 may omit the processing at S41 to S53 when the liquid level control time period is stored in the flash memory 44 at the time the initial introduction processing is started or at the time the replacement processing is started. In other words, in the initial introduction processing, the CPU 41 may shift the state of the liquid level LL from the state A11 to the state A14 while skipping the states A12 and A13. In the replacement processing, the CPU 41 may shift the state of the liquid level LL from the state A21 to the state A22, and shift the state of the liquid level LL to the state A25 while skipping the states A23 and A24.

In the initial introduction processing, the CPU 41 may stop the driving of the discharge pump 93 by the processing at S53. In this case, the liquid level LL is at the lower limit level L2 at the time at which the processing at S53 is performed. In a similar manner, in the replacement processing, the CPU 41 may stop the driving of the discharge pump 93 by the processing at S53 or S73. According to this configuration, the CPU 41 contributes to the advantage that the discharge amount of the liquid from the container 71 decreases.

In the above-described embodiment, one of the supply tank 81 or the discharge tank 91 may be omitted. For example, the printer 1 may be configured not to be able to discharge the liquid from the container 71 under the control of the CPU 41. The printer 1 may be configured to not be able to supply the liquid to the container 71 under the control of the CPU 41. For example, when it is not possible to supply the liquid to the container 71 under the control of the CPU 41, the user supplies the liquid to the container 71 manually until the liquid level LL reaches the upper limit level L1. In this state, the CPU 41 controls the discharge pump 93 on the basis of the liquid level control time period, such that the liquid level LL becomes lower than the upper limit level L1 and higher than the bottom surface 711.

In the supply processing, the CPU 41 may omit the processing at S85. In other words, the CPU 41 may cause the liquid level LL to rise to the upper limit level L1 after switching the supply valve 83 to the open state by the processing at S82. In place of the processing at S91 to S93, or after the processing at S91 to S93, the CPU 41 may control the discharge pump 93 based on the liquid level control time period, such that the liquid level LL becomes lower than the upper limit level L1. In this case, the CPU 41 contributes to the advantage that the discharge amount of the liquid from the container 71 decreases.

The container 71 is not limited to being the tank, and, as long as it is able to store the liquid, may be a bin or the like. The bottom surface 711 may be a flat surface, or may be a curved surface. When the bottom surface 711 is the curved surface, the liquid level LL is defined by a height from a specific position (a bottom end, for example) of the bottom surface 711.

In place of the CPU 41, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42, the flash memory 44, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or the flash memory 44. In this case, the control program may be stored in a non-transitory storage medium, such as an HDD provided in the server.

What is claimed is:

1. A printer configured to perform printing using an inkjet head, the printer comprising:
- a container including a bottom surface and configured to store a liquid;
- a transducer configured to humidify air by causing the liquid stored in the container to vibrate;
- a first change mechanism including at least one of a first valve or a first pump, and configured to change a liquid level of the liquid stored in the container, using the at least one of the first valve or the first pump;
- a first sensor configured to output a first detection signal indicating that the liquid level reaches a first height;
- a processor; and
- a memory storing computer-readable instructions that, when executed by the processor, instruct the processor to perform processes comprising:
  - change processing of controlling the first change mechanism and changing the liquid level; and
  - first maintaining processing of, after the change processing is performed, controlling the first change mechanism and maintaining the liquid level at a maintained position lower than the first height and higher than the bottom surface.

2. The printer according to claim 1, further comprising:
- a second sensor configured to output a second detection signal indicating that the liquid level reaches a second height lower than the first height, wherein
- the computer-readable instructions instruct the processor to perform processes further comprising:
  - humidification processing of humidifying the air by causing the transducer to vibrate;
  - during execution of the humidification processing, when the second detection signal is output by the second sensor, performing the change processing by controlling the first change mechanism and raising the liquid level; and
  - in the first maintaining processing, controlling the first change mechanism based on a liquid level control parameter and maintaining the liquid level at the maintained position, the liquid level control parameter being a parameter for maintaining the liquid level at the maintained position in the first maintaining processing and stored in a storage.

3. The printer according to claim 2, wherein
- the computer-readable instructions instruct the processor to perform processes further comprising:
  - after the change processing is performed, second maintaining processing of controlling the first change mechanism and maintaining the liquid level at the first height, when the first detection signal is output by the first sensor before the first change mechanism is controlled by the first maintaining processing based on the liquid level control parameter and the liquid level is maintained at the maintained position; and continuously performing the humidification processing when the second maintaining processing is performed during the execution of the humidification processing.

4. The printer according to claim 2, wherein the computer-readable instructions instruct the processor to perform processes further comprising:

after the change processing is performed, second maintaining processing of controlling the first change mechanism and maintaining the liquid level at the first height, when the first detection signal is output by the first sensor before the first change mechanism is controlled by the first maintaining processing based on the liquid level control parameter and the liquid level is maintained at the maintained position; and storage processing of storing the liquid level control parameter in the storage, based on the first detection signal being output by the first sensor.

5. The printer according to claim 2, wherein the computer-readable instructions instruct the processor to perform processes further comprising:

reception processing of receiving a command to perform an initial introduction to supply the liquid to the container;

raising processing of controlling the first change mechanism and raising the liquid level, when the command is received by the reception processing; and storage processing of storing the liquid level control parameter in the storage, based on the first detection signal being output by the first sensor.

6. The printer according to claim 2, further comprising:

a second change mechanism including at least one of a second valve or a second pump, and configured to lower the liquid level using the at least one of the second valve or the second pump, wherein the first change mechanism raises the liquid level using the at least one of the first valve or the first pump, and the computer-readable instructions instruct the processor to perform processes further comprising:

reception processing of receiving a command to replace the liquid stored in the container;

lowering processing of controlling the second change mechanism and lowering the liquid level, when the command is received by the reception processing;

after the lowering processing is performed, raising processing of controlling the first change mechanism and raising the liquid level, based on the second detection signal being output by the second sensor; and storage processing of storing the liquid level control parameter in the storage, based on the first detection signal being output by the first sensor.

7. The printer according to claim 2, wherein the computer-readable instructions instruct the processor to perform processes further comprising:

raising processing of controlling the first change mechanism and raising the liquid level;

after the raising processing is performed, specification processing of specifying the liquid level control parameter, based on the first detection signal being output by the first sensor or based on the second detection signal being output by the second sensor; and storage processing of storing, in the storage, the liquid level control parameter specified by the specification processing.

8. The printer according to claim 1, further comprising:

a second change mechanism including at least one of a second valve or a second pump, and configured to lower the liquid level using the at least one of the second valve or the second pump, wherein the first change mechanism raises the liquid level using the at least one of the first valve or the first pump, and the computer-readable instructions instruct the processor to perform processes further comprising:

raising processing of controlling the first change mechanism and raising the liquid level;

after the raising processing is performed, lowering processing of controlling the second change mechanism and lowering the liquid level, when the first detection signal is output by the first sensor;

after the lowering processing is performed, performing the change processing of controlling the first change mechanism and raising the liquid level; and in the first maintaining processing, controlling the first change mechanism based on a liquid level control parameter and maintaining the liquid level at the maintained position, the liquid level control parameter being a parameter for maintaining the liquid level at the maintained position in the first maintaining processing, and stored in a storage.

9. A control method of a printer configured to perform printing using an inkjet head, the printer being provided with a container including a bottom surface and configured to store a liquid, a transducer configured to humidify air by causing the liquid stored in the container to vibrate, and a first change mechanism including at least one of a first valve or a first pump, the first change mechanism being configured to change a liquid level of the liquid stored in the container, using the at least one of the first valve or the first pump, the control method comprising:

change processing of controlling the first change mechanism and changing the liquid level; and first maintaining processing of, after the change processing is performed, controlling the first change mechanism and maintaining the liquid level at a maintained position lower than a first height and higher than the bottom surface.

10. A non-transitory computer-readable medium storing computer-readable instructions that, when executed by a computer of a printer configured to perform printing using an inkjet head, cause the computer to perform processes, the printer being provided with a container including a bottom surface and configured to store a liquid, a transducer configured to humidify air by causing the liquid stored in the container to vibrate, and a first change mechanism including at least one of a first valve or a first pump, the first change mechanism being configured to change a liquid level of the liquid stored in the container, using the at least one of the first valve or the first pump, the processes comprising:

change processing of controlling the first change mechanism and changing the liquid level; and first maintaining processing of, after the change processing is performed, controlling the first change mechanism and maintaining the liquid level at a maintained position lower than a first height and higher than the bottom surface.

* * * * *